US008170433B2

(12) United States Patent
Kubo

(10) Patent No.: US 8,170,433 B2
(45) Date of Patent: May 1, 2012

(54) IMAGE FORMING APPARATUS WITH ROTATION-SPEED-RELATED ADJUSTABLE PHOTOSENSITIVE MEMBER CHARGING BIAS

(75) Inventor: Norihiko Kubo, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 12/608,275

(22) Filed: Oct. 29, 2009

(65) Prior Publication Data

US 2010/0111550 A1 May 6, 2010

(30) Foreign Application Priority Data

Oct. 30, 2008 (JP) ................................ 2008-280559
Oct. 20, 2009 (JP) ................................ 2009-241698

(51) Int. Cl.
*G03B 15/02* (2006.01)

(52) U.S. Cl. .............................. 399/50; 399/46; 399/48

(58) Field of Classification Search .................... 399/46, 399/48, 50
See application file for complete search history.

(56) References Cited

U.S. PATENT DOCUMENTS 4,461,819 A 7/1984 Nakagawa et al.
4,551,405 A 11/1985 Nakagawa et al.
4,557,990 A 12/1985 Nakagawa et al.
4,613,558 A 9/1986 Nakagawa et al.
4,670,369 A 6/1987 Nakagawa et al.
RE35,198 E 4/1996 Nakagawa et al.
5,512,982 A * 4/1996 Takahashi et al. ............ 399/176
2001/0019669 A1 * 9/2001 Watanabe et al. ............... 399/50
2002/0102108 A1 * 8/2002 Adachi et al. .................. 399/50
2009/0028591 A1 1/2009 Kubo
2010/0239286 A1 * 9/2010 Hanashi .......................... 399/50

FOREIGN PATENT DOCUMENTS

JP 54-143645 A 11/1979
JP 10-149075 A 6/1998
JP 2001-201920 A 7/2001

* cited by examiner

*Primary Examiner* — Ryan Walsh
(74) *Attorney, Agent, or Firm* — Fitzpatrick, Cella, Harper & Scinto

(57) ABSTRACT

An image forming apparatus includes a rotatable photosensitive member chargeable by a charging member; an applying device for applying to the charging member a charging bias; an image forming device for forming a toner image on the photosensitive member; a setting device for setting a first frequency of a first charging bias in a first rotation speed mode and for setting a second frequency of a second charging bias in a second rotation speed mode; a detector for detecting current passing between the charging and the photosensitive members during application of a test bias to the charging member; and an adjusting device for adjusting the second charging bias based on an output of the detector when the photosensitive member is rotated at a first speed and a test bias having the second frequency is applied to the charging member when switching from the first to the second rotation speed modes.

5 Claims, 16 Drawing Sheets

IMAGE FORMING APPARATUS WITH ROTATION-SPEED-RELATED ADJUSTABLE PHOTOSENSITIVE MEMBER CHARGING BIAS

FIELD OF THE INVENTION AND RELATED ART

The present invention relates to an image forming apparatus of an electrophotographic type such as a copying machine, a printer or a facsimile machine.

As a charging method of electrically charging a photosensitive member (photosensitive drum), a method of electrically charging the photosensitive member by using a charging roller which is a roller-shaped charging member has been employed in a product. When the photosensitive member is uniformly charged by using the charging roller, a method of applying to the charging roller an AC voltage which is two times or more a discharge start voltage in a minute gap between the photosensitive member and the charging roller at the time of applying a DC voltage component of a peak-to-peak voltage (hereinafter referred to as an AC charging method) has been known. However, compared with a method of applying only the DC voltage to the charging roller to charge the photosensitive member (hereinafter referred to as a DC charging method), the AC charging method provides a larger amount of electric discharge (discharge amount). For this reason, it has been known that an image defect such as image detection (image flow) or blurriness and a shortening in lifetime are liable to occur. Further, a relationship between a peak-to-peak voltage Vpp of the AC voltage and the discharge amount varies depending on condition of environment and durability of an image forming apparatus. When the discharge amount is excessively small due to the environmental variation, charging uniformity is impaired. On the other hand, when the discharge amount is excessively large, an electric discharge product is generated in a large amount, thus causing the image defect. For that reason, Japanese Laid-Open Patent Application (JP-A) 2001-201920discloses a method of determining the AC peak-to-peak voltage Vpp capable of providing a proper discharge amount irrespective of the environment variation (hereinafter referred to as discharge current amount control).

The image forming apparatus includes those capable of forming an image on not only plain paper but also papers with a large thickness such as thick paper, an OHP sheet, a postcard, and glossy paper. In the case of transferring a toner image onto a transfer material using the papers with the large thickness or a special material (hereinafter referred to as special paper), such a constitution that transfer and fixation are performed at a speed which is about ½ of that in the case of forming the toner image on the plain paper has been employed in a many image fowling apparatuses. In the case of forming the papers with the large thickness, when a rotational speed of the photosensitive member (hereinafter also referred to as a process speed) is lowered without changing an image forming condition, the discharge amount per unit area of the photosensitive member is increased, thus causing the image defect and shortening lifetime.

For that reason, JP-A Hei 10-149075 discloses a constitution in which a frequency (charging frequency) of an AC voltage to be applied to the charging roller in a low speed mode in which the image is formed on the special paper is made lower than the charging frequency in a normal speed mode (normal mode). For example, in the case where the toner image is formed on the special paper, a conveying speed of the special paper is about ½ of the conveying speed of the plain paper. In this case, the charging frequency in the case of forming the toner image on the special paper (in ½ speed mode) is also about ½ of the charging frequency in the case of forming the toner image on the plain paper (in the normal mode). That is, when the charging frequency in the normal mode in which the image is formed on the plain paper is 2100 Hz, an AC voltage having the frequency of 1050 Hz is applied to the charging roller in the ½ speed mode in which the image is formed on the special paper. Further, in the case of forming the image on the special paper at the conveying speed which is about ⅓ of that for the plain paper, the AC voltage having the frequency of 700 Hz is applied to the charging roller. Here, it has been known that it is difficult to output a waveform having a broad-band frequency range (e.g., 700 Hz to 2100 Hz) with no distortion by using a single high voltage source circuit board (high voltage board) (FIG. 13). That is, when the waveform of a charging AC voltage with a high frequency range is intended to be ensured by using the single high voltage board, it is difficult to ensure the waveform of the charging AC voltage with a low frequency range from the viewpoint of a characteristic of the high voltage board. Further, with respect to a relationship between the frequency and the distortion, it has been known that a degree of the distortion is increased with a decreased frequency value in a range of about 1 KHz or less (FIG. 14). This is because the disturbance of the waveform at the low frequency can be considered to be caused by an AC impedance of the voltage source. For that reason, by increasing a capacity of a capacitor between an output tube plate and a cathode, it is possible to remedy the disturbance of the waveform at the low frequency. However, it is difficult to remedy the distortion of a sine waveform in all the frequency ranges.

Thus, when the charging frequency is changed, the waveform of the AC voltage is distorted. Therefore, even when the same peak-to-peak voltage Vpp is applied at two different charging frequencies, a difference in discharge current amount is caused to occur. For that reason, in order to maintain an appropriate discharge current amount, it is preferable that the peak-to-peak voltage Vpp depending on the charging frequency is determined.

However, when the AC current amount and the discharge current amount are intended to be controlled at a constant level after the rotational speed of the photosensitive member is lowered every use of the special paper, a down time (a period in which the image cannot be output) during the control of the discharge current amount is increased. As a result, image productivity is lowered. Further, an image formation preparing time for forming the image on the special paper with the AC current amount after the rotational speed of the photosensitive member is lowered (hereinafter referred to as a pre-rotation time) is increased so that a time until the image formed on a first sheet is output (first copy time (FCOT)) is adversely increased.

SUMMARY OF THE INVENTION

A principal object of the present invention is to provide an image forming apparatus capable of properly suppressing a charging condition of a photosensitive member at each of image forming speeds in the case where the image forming speed is changed and capable of suppressing a lowering in image productivity due to a control operation of the charging condition associated with the change in the image forming speed.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, the image forming apparatus according to the present invention will be described with reference to the drawings.

[Embodiment 1]

First, a constitution of the image forming apparatus in this embodiment will be described ((1) to (7)). Then, discharge current amount control in the case where a job using plain paper and a job using special paper (the thick paper, the OHP paper, etc.) are co-present will be described with reference to time charts and a flowchart ((8) to (13)).

(1) General Structure of Image Forming Apparatus

Figure 1:
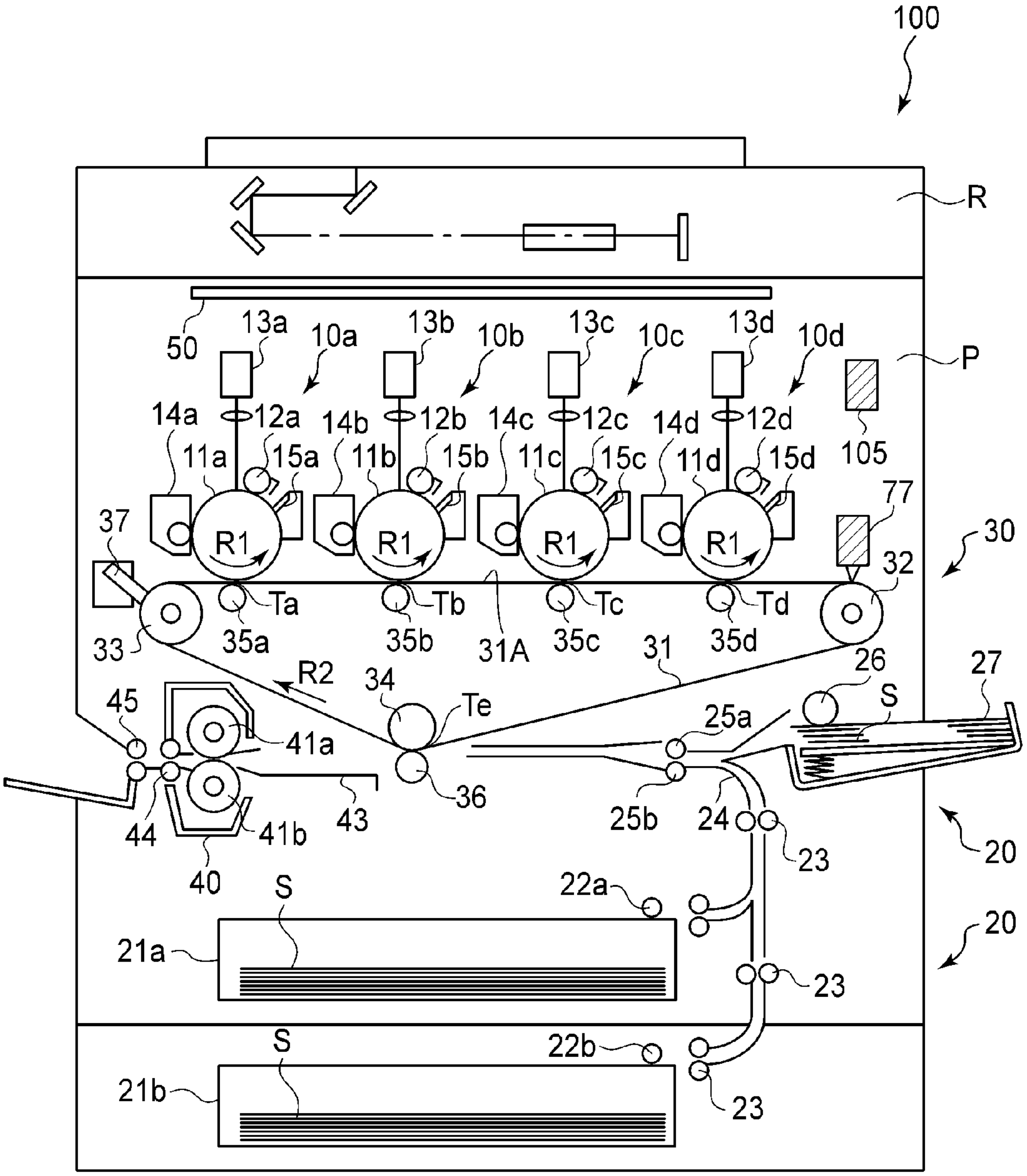
FIG. 1 is a schematic sectional view of an image forming apparatus according to an embodiment of the present invention.

FIG. 1 is a schematic sectional view of an image forming apparatus 100 in this embodiment. The image forming apparatus in this embodiment is a tandem-type full-color image forming apparatus in which four image forming portions (stations) are disposed side by side along a movement direction of an intermediary transfer member (belt).

The image forming apparatus 100 includes an original reading portion R for reading an original image and an image output portion P. The image output portion roughly includes four image forming portions 10 (10*a*, 10*b*, 10*c*, 10*d*), a sheet feeding unit 20, an intermediary transfer unit 30, a fixing unit 40, and a control unit 50.

Figure 2:
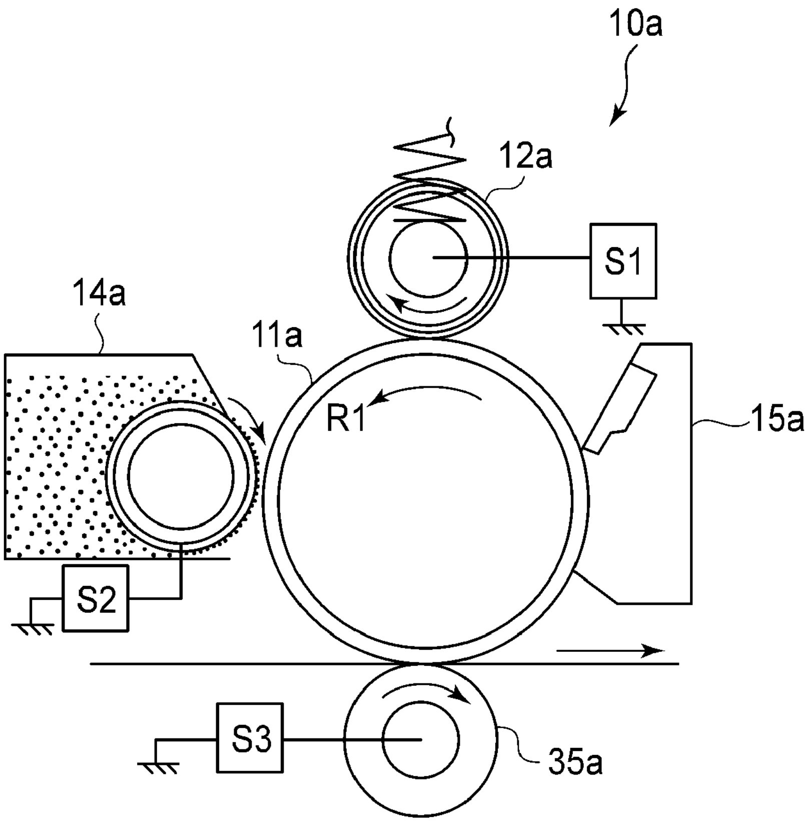
FIG. 2 is a schematic detailed sectional view of an image forming portion of the image forming apparatus.

Each of the units of the image forming apparatus 100 will be described more specifically. In this embodiment, the four image forming portions 10*a*, 10*b*, 10*c* and 10*d* disposed side by side have the substantially same constitution except that the colors of developers used are different from each other. FIG. 2 shows a detailed structure of the image forming portion 10*a* as an example of the image forming portions. Each image forming portion 10 includes a cylindrical photosensitive member (photosensitive drum) 11 (11*a*, 11*b*, 11*c*, 11*d*) as a rotatable image bearing member. A center rotation shaft of the photosensitive member 11 is supported and the photosensitive member 11 is rotationally driven in a direction indicated by an arrow R1 (counterclockwise direction) at a predetermined rotational speed (peripheral speed). Oppositely to an outer peripheral surface of the photosensitive member 11, the following means are disposed along the rotational direction of the photosensitive member 11. Further, a charging roller 12 (12*a*, 12*b*, 12*c*, 12*d*) which is a roller-shaped charging member as a charging means is disposed. Next, a laser scanner unit 13 (13*a*, 13*b*, 13*c*, 13*d*) as an exposure means is disposed. Then, a developing device 14 (14*a*, 14*b*, 14*c*, 14*d*) as a developing means is disposed. Then, a cleaning device 15 (15*a*, 15*b*, 15*c*, 15*d*) as a cleaning means for the photosensitive member 11 is disposed. Further, the intermediary transfer unit 30 is disposed oppositely to the respective image form portions 10. The intermediary transfer unit 30 includes an endless belt-type intermediary transfer belt 31 as the intermediary transfer member. As a material for the intermediary transfer belt 31, it is possible to use, e.g., PI (polyimide), PET (polyethylene terephthalate), and PVdF (polyvinylidene fluoride). The intermediary transfer belt 31 is extended around a driving roller 32, a tension roller 33, a secondary transfer opposite roller 34 which are a supporting member. The driving roller 32 transmits a driving force to the intermediary transfer belt 31. The tension roller 33 applies an appropriate tension to the intermediary transfer belt 31 by urging by a spring as an urging means. Between the driving roller 32 and the tension roller 33, a primary transfer flat surface 31A is created. Further, the driving roller 32 is constituted by coating the surface of a metal roller with a several mm-thick layer of a rubber (urethane rubber or chloroprene rubber), thus being prevented from slipping on the belt. Further, the driving roller 32 is rotationally driven by a pulse motor. As a result, the intermediary transfer belt 31 is rotated (circulatively moved) in a direction indicated by an arrow R2 (in the clockwise direction). In this embodiment, the peripheral speeds of the intermediary transfer belt 31 and the photosensitive member 11 are substantially equal to each other.

On an inner peripheral surface of the intermediary transfer belt 31, a primary transfer roller 35 (35*a*, 35*b*, 35*c*, 35*d*) as a primary transfer means is disposed at a position in which the primary transfer roller 35 opposes the associated photosensitive member 11. Each primary transfer roller 35 urges the intermediary transfer belt 31 against the associated photosensitive member 11 to form a primary transfer portion (area) (Ta, Tb, Tc, Td) in which the intermediary transfer belt 31 contacts each photosensitive member 11. Further, on the outer peripheral surface of the intermediary transfer belt 31, a secondary transfer roller 35 as a secondary transfer means is disposed at a position in which the secondary transfer roller 36 opposes the secondary transfer opposite roller 34. The secondary transfer roller 36 contacts the intermediary transfer belt 31 to form a secondary transfer portion (area) Te, where the secondary transfer roller 36 is urged against the intermediary transfer belt 31 under a proper pressure. Further, in the rotational direction of the intermediary transfer belt 31, downstream of the secondary transfer portion Te, an intermediary transfer member cleaner 37 for cleaning an image forming surface of the intermediary transfer belt 31 is provided. The intermediary transfer member cleaner 37 is provided with a cleaning member such as a brush roller and with a residual toner box for containing residual toner.

By the charging by each charging roller 12, electric charges with a uniform charge amount are provided to the surface of each photosensitive member 11. In this case, to the charging roller 12, a predetermined charging bias voltage is applied from a charging bias source S1 as a charging bias applying means. Then, the surface of each photosensitive member 11 is subjected to light exposure by each laser scanner unit 13 with a light beam modulated depending on a recording image signal (a laser beam in this embodiment). As a result, on each photosensitive member 11, an electrostatic latent image (electrostatic image) is formed. By each developing device 14, the electrostatic latent image is visualized. At this time, to a developing sleeve as a developer carrying member provided to the developing device 14, a predetermined developing bias voltage is applied from a developing bias source S2 as a developing bias applying means. In the developing devices 14*a*, 14*b*, 14*c* and 14*d*, color toners of yellow, cyan, magenta and black are accommodated, respectively. In this embodiment, the developing device 14 is a two component developing device using a two component developer, as a developer, containing a mixture of a non-magnetic toner and a magnetic carrier. Further, in this embodiment, the developing device 14 develops the electrostatic latent image on the photosensitive member 11 by a reversal developing method. That is, the toner image is flaw ed on the photosensitive member 11 by depositing the toner charged to an identical polarity to the charge polarity of the photosensitive member 11 at a portion where the electric charges are attenuated by the exposure (exposed portion) of the surface of the photosensitive member 11.

In this embodiment, the laser scanner unit 13 and the developing device 14 constitutes a toner image forming means for forming the toner image on the photosensitive member 11 charged by the charging roller 12. The visible image (toner image) formed on each photosensitive member 11 is transferred (primary-transferred) onto the intermediary transfer belt 31 at each of the primary transfer portions Ta to Td by the action of the primary transfer blades 35*a* to 35*d*. At this time, to the primary transfer roller 35, a predetermined primary transfer bias voltage is applied from a primary transfer bias source S3 as a primary transfer bias applying means. On a downstream side of the primary transfer portions (areas) Ta, Tb, Tc and Td with respect to the rotational direction of the respective photosensitive members 11, cleaning devices 15 (15*a*, 15*b*, 15*c*, 15*d*) as a cleaning means is disposed. The toner remaining on each of the photosensitive members 11*a* to 11*d* without being transferred onto the intermediary transfer belt 31 (untransferred toner) is removed and collected by a cleaning blade as a cleaning member provided to each cleaning device 15. As a result, the surface of each photosensitive member 11 is cleaned.

Through the above-described process, image formation with the respective color toners is successively performed. For example, during full-color image formation, the four color toner images are successively transferred onto the intermediary transfer belt 31 in a superposition manner by the four image forming portions 10*a*, 10*b*, 10*c* and 10*d*. The sheet feeding unit 20 includes the following means. That is, the sheet feeding unit 20 includes cassettes 21*a* and 21*b* for accommodating a transfer material S, a manual sheet feeding tray 27, and pick-up rollers 22*a*, 22*b* and 26 for feeding the transfer material S one by one from the cassettes or the tray. The sheet feeding unit 20 further includes a sheet feeding roller pair and a sheet feeding guide 24 for carrying the transfer material S fed from each pick-up roller to registration rollers 25*a* and 25*b* and includes the registration rollers 25*a* and 25*b* for sending the transfer material S to the secondary transfer portion Te while being timed to the image formation by each of the image forming portions. The toner images formed on the intermediary transfer belt 31 are collectively transferred (secondary-transferred) onto the transfer material S at the secondary transfer portion Te by the action of the secondary transfer roller 36. At this time, to the secondary transfer roller 36, a predetermined secondary transfer bias voltage is applied from a secondary transfer bias source (not shown) as a secondary transfer bias applying means.

The transfer material S subjected to the transfer of the toner images at the secondary transfer portion (area) Te is separated from the intermediary transfer belt 31 and thereafter is introduced into the fixing unit 40 in which the toner images are fixed on the transfer material S. The fixing unit 40 includes a fixing roller 41*a* provided with a heat source such as a halogen heater inside the fixing roller 41*a* and includes a pressure roller 41*b* to be pressed by the fixing roller 41*a*. The pressure roller 41*b* may also contain the heat source. The fixing unit 40 further includes a guide 43 for guiding the transfer material into a nip between the rollers 41*a* and 41*b*, and inner sheet discharging rollers 44 and outer sheet discharging rollers 45 for guiding the transfer material S, discharged from the rollers, to the outside of the image forming apparatus. The transfer material S coming out of the fixing unit 40 is discharged outside the image forming apparatus by the inner and outer sheet discharging rollers 44 and 45.

The control unit 50 is constituted by a control board for controlling operations of mechanisms in the above-described respective units and by a motor drive board and the like. Further, the image forming apparatus 100 includes an environment sensor (temperature/humidity sensor) 105 as an environment detecting means for detecting environment (temperature/humidity). The environment sensor 15 is disposed at a position indicated in FIG. 1 separated from the fixing unit 40 through the intermediary transfer unit 30 so that an ambient temperature/humidity of the image forming apparatus can be accurately measured without being influenced by the fixing unit 40 which is a heat source in the image forming apparatus. On the basis of an output of the environment sensor 105, various control operations including control of the image forming condition are performed in the control unit 50.

(2) Toner

As a property of the toner, it is preferable that the toner has a weight-average particle size of 5 to 8 μm from the viewpoint of formation of a good image. When the weight-average particle size is in this range, a sufficient resolution and formation of a clear and high-quality image can be realized and a depositing force and a cohesive force are smaller than an electrostatic force, so that various troubles are alleviated.

The weight-average particle size of the non-magnetic toner particles can be measured by various methods such as a sieving method, a sedimentation method and a photon correlation method but, in the present invention, is measured in the following manner. As a measuring apparatus, a Coulter Multisizer (trade name, mfd. by Beckman Coulter, Inc.) is used. As an electrolytic solution, 1%-NaCl aqueous solution is prepared by using a special grade or first class grade sodium chloride (e.g., "ISOTON-II", mfd. by Coulter Scientific Japan) is used. To 100-150 ml of this electrolytic solution, 0.1-5 ml of a surfactant as a dispersant, preferably alkylbenzene sulfonate is added. To the mixture, 2-20 mg of toner as a measurement sample is added. The resultant electrolytic solution in which the measurement sample is suspended is subjected to ultrasonic dispersion for about 1 to 3 minutes in a ultrasonic dispersing device. Then, by using 100 μm-aperture, a volume and the number of the toner particles are measured to calculate a volume distribution and a number distribution. The weight-average particle size is obtained from the volume distribution. In this case, a center value of each channel is used as a represented value of each channel. Thus, the weight-average particle size of the non-magnetic toner particles can be measured.

The non-magnetic toner particles can be produced by a known manufacturing method. The non-magnetic toner particles can also be produced by a pulverization method in which constituent materials are uniformized by heat-fusing and solidified by cooling, followed by pulverization to obtain toner particles. However, the toner particles obtained by this pulverization method are generally irregular in shape. For this reason, in order to provide a substantially spherical shape, it is necessary to perform mechanical, thermal or same special process. Further, in order to realize the weight-average particle size in the above-described range, it is necessary to classify the toner particles after being subjected to a conglobation process. Therefore, as the manufacturing method suitable for the non-magnetic toner particles, a polymerization method may preferably be employed.

(3) Intermediary Transfer Unit

In this embodiment, as a material for the intermediary transfer belt 31, a 100 μm-thick polyimide film was used. As the primary transfer roller 35, an urethane sponge roller was used. Further, the rotational speed (peripheral speed) of the intermediary transfer belt 31 is 300 mm/sec and a width of each of the primary transfer portions Ta to Td with respect to the thrust direction (the axial (shaft) direction of the primary transfer roller 35) is 330 mm. The toner on the photosensitive member 11 has a charge retaining amount of 30 μC/g and a current of 40 μmA is applied to a core metal of the primary transfer roller during the primary transfer. This applied current amount may desirably be changed depending on a change in toner charge retaining amount or the like caused due to a change in environment but the above value is a proper current value set in a normal environment (23° C./60% RH).

A specific constitution of the primary transfer roller 35 is as follows. The primary transfer roller 35 is the urethane sponge roller which has a resistance value of $5\times10^7$ under application of a voltage of 1 kV and has an outer diameter of 16 mm and a core metal diameter of 8 mm. In a manufacturing method of the urethane sponge roller, as a polyurethane forming material, a mixture of a polyol component, a polyisocyanate component, a foaming material, and optional additives such as an electroconductivity imparting agent, a catalyst, and a foam stabilizer is used. In the polyurethane forming material, the polyol component and the polyisocyanate component may also be contained in the form of a prepolymer including a reacted product of these components. The polyol component used for producing the polyol or the prepolymer is not particularly limited but may include, e.g., polyether polyol, polyester polyol, and hydrophobic polyol.

(4) Charging Roller

In this embodiment, a surface layer of the charging roller 12 is formed of 1-2 mm thick electroconductive rubber in which an electroconductive material such as carbon black is dispersed and mixed, and is controlled so that a resistance value thereof is $10^5$ to $10^7$ ohm.cm in order to prevent charging non-uniformity during the image formation. Further, the charging roller 12 is of a contact type in which it is contactable to the photosensitive member 11 without creating a gap by utilizing its elasticity, and charges the photosensitive member 11 at a low voltage. As the charging roller 12, the following member can be used. On a surface of an electroconductive support, ABS resin which contains an ion conductive polymeric compound such as polyetherester amide and is controlled so as to have a resistance value of $10^5$ to $10^7$ ohm.cm is coated in a thickness of 0.5 to 1 mm by injection molding to form a resistance adjustment layer. On the surface of the resistance adjustment layer, a protective layer of a thermoplastic resin composition containing electroconductive fine particles of tin oxide or the like dispersed therein is formed. As the electroconductive support to which a charging voltage is to be applied, a metal shaft member is used. The metal shaft member is constituted by integrally molding a shaft-supporting portion, a voltage-applying shaft-supporting portion, and a coating portion providing an outer diameter of 14 mm. On the peripheral surface of the coating layer, the resistance adjustment layer, of the ABS resin (thermoplastic resin) containing the ion conductive polymeric compound such as polyetherester amide, adjusted to have a volume resistivity of $10^5$ to $10^7$ ohm.cm is coated in the thickness of 0.5 to 1 mm by the injection molding.

(5) Photosensitive Member

As the photosensitive member 11, a negatively chargeable OPC (organic photoconductor) photosensitive member was used. Specifically, a negatively chargeable organic semiconductor layer (OPC layer) including a carrier generation layer (CGL) of an azo pigment and thereon a 29 μm-thick carrier transport layer (CTL) of a mixture of hydrazone and a resin material is prepared and used.

Figure 3:
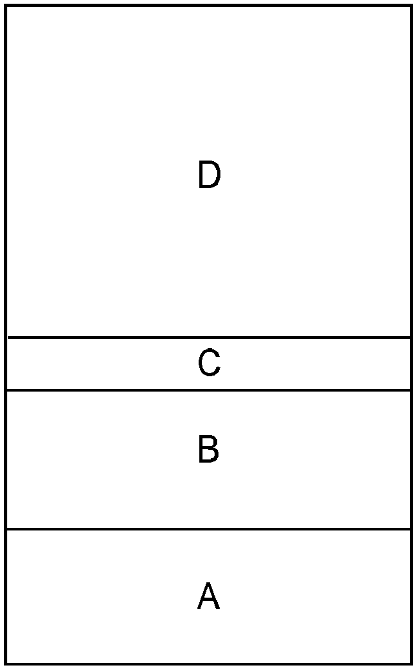
FIG. 3 is a schematic view of a layer structure of a photosensitive member in the embodiment.

More specifically, as shown in FIG. 3, the photosensitive member 11 is an organic photosensitive member constituted by laminating on a support A an undercoat layer B, a charge generation layer C, and a charge transport layer D in this order. The support A is not particularly limited so long as it exhibits electroconductivity and does not adversely affect measurement of hardness. For example, as the support A, it is possible to use a drum-like molded product of metal or alloy such as aluminum, copper, chromiun, nickel, zinc, or stainless steel.

The undercoating layer B is formed for improving an adhesive property of the photosensitive layer, improving a coating property of the photosensitive layer, protecting the support, coating a defect on the support, improving a charge injection property from the support, or protecting the photosensitive layer from electrical breakdown.

As a material for the undercoat layer B, it is possible to use polyvinyl alcohol, poly-N-vinylimidazole, polyethylene oxide, ethyl cellulose, ethylene-acrylic acid copolymer, casein, polyamide, N-methoxymethyl 6-nylon, copolymer nylon, glue, and gelatine. These materials are dissolved in an appropriate solvent and then are applied onto the surface of the support. A thickness of the undercoat layer B may suitably be 0.1-2 μm.

On the undercoat layer B, the photosensitive layer is formed. In the case where the photosensitive member is of a functionally-separated type in which the charge generation layer C and the charge transport layer D are function-separated and laminated, the charge generation layer C and the charge transfer layer D are laminated on the undercoat layer B in this order.

As the charge generating substance used for the charge generating layer C, it is possible to use selenium-tellunium (Se—Te) alloy, pyrilium dyes, thiapyrylium dyes, and compounds having various center metal elements and crystal systems. Specifically, it is possible to use phthalocyanine compounds having crystal systems such as αtype, βtype, γtype, ϵtype, and x type; anthoanthorone pigments; dibenzpyrenequinone pigments; pyranthorone pigments; and trisazo pigments. It is also possible to use disaze pigments, monoazo pigments, indigo pigments, quinacridone pigments, asymmetrical quinocyanine pigments, quinocyanine, and amorphous silicon as described in JP-A Sho 54-143645. In this embodiment, the charge generation layer using the phthalocyanine compound capable of enhancing sensitivity in order to realize high quality was used. Further, in the case of the functionally-separated type photosensitive member, the charge generation layer C is formed in the following manner. The generating substance is dispersed together with a binder resin material and a solvent, in an amount which is 0.3-4 times that of the charge generating substance, by dispersing means such as a homogenizer, an ultrasonic dispersing device, a ball mill, a vibratory ball mill, a sand mill, an attritor, and a roll mill. Then, the dispersion is applied onto the undercoat layer B and dried to form the charge generation layer C. Alternatively, the charge generation layer C is formed on the undercoat layer B as a single constituent film by using a vapor deposition method or the like. A thickness of the charge generation layer C is preferably 5 μm or less, particularly preferably 0.1-2 μm.

Examples of the binder resin material used may include polymers and copolymers of vinyl compounds such as styrene, vinyl acetate, vinyl chloride, acrylates, methacrylates, vinylidene fluoride, and trifluoroethylene, and may include, polyvinyl alcohol, polyvinyl acetal, polycarbonate, polyester, polysulfone, polyphenylene oxide, polyurethane, cellulose resin, phenolic resin, melamine resin, silicone resin, and epoxy resin.

The surface layer can be formed by polymerizing or crosslinking a hole transporting compound having a chain-polymerizable functional group. The charge generating layer D is formed in the following manner. An appropriate charge transporting substance is dispersed or dissolved in a solvent together with an appropriate binder resin. The binder resin may be those for the charge generation layer C described above. The solution (dispersion) is then applied onto the charge generation layer c by using the above-described known method, followed by drying to form the charge transport layer D. As the charge transporting substance, it is possible to use polymeric compounds, having a heterocycle or a fused polycyclic aromatic group, such as poly-N-vinylcarbazole and polystyrylanthracene. It is also possible to use heterocyclic compounds such as pyrazoline, imidazole, oxazole, triazole, and carbazole; and trialylalkane compounds such as triphenylmethane. It is further possible to use low-molecular weight compounds including triarylamine derivatives such as triarylamine; phenylenediamine derivatives; N-phenylcarbazole derivatives; stilbene derivatives; and hydrazone derivatives. In this case, with respect to a weight ratio between the charge transporting substance and the binder resin, when a total weight of the charge transporting substance and the binder resin is taken as 100, the weight of the charge transporting substance may preferably 20 to 100, more preferably 30 to 100. When the weight of the charge transporting substance is less than 20, a charge transporting performance is lowered, so that there arise problems of a lowering in sensitivity and an increase in residual potential. In the lamination-type photosensitive member provided with the protective layer, the thickness of the charge transport layer D may preferably 1 to 50 μm, more preferably 3 to 30 μm. In this embodiment, the charge transport layer D in the photosensitive member has the thickness of 29 μm.

(6) Cleaning Device

The cleaning device 15 is of a counter blade type. That is, the cleaning device 15 includes a plate-like member, which is brought into contact with the photosensitive member 11 toward an upstream side with respect to the rotational direction of the photosensitive member 1 at its free end, i.e., a cleaning blade as the cleaning member. In this embodiment, the cleaning blade has a free length of 8 mm. This cleaning blade is an elastic blade principally comprising an urethane rubber and is urged against the photosensitive member 11 with a linear pressure of about 35 g/cm.

(7) Charging Bias Application System

Figure 4:
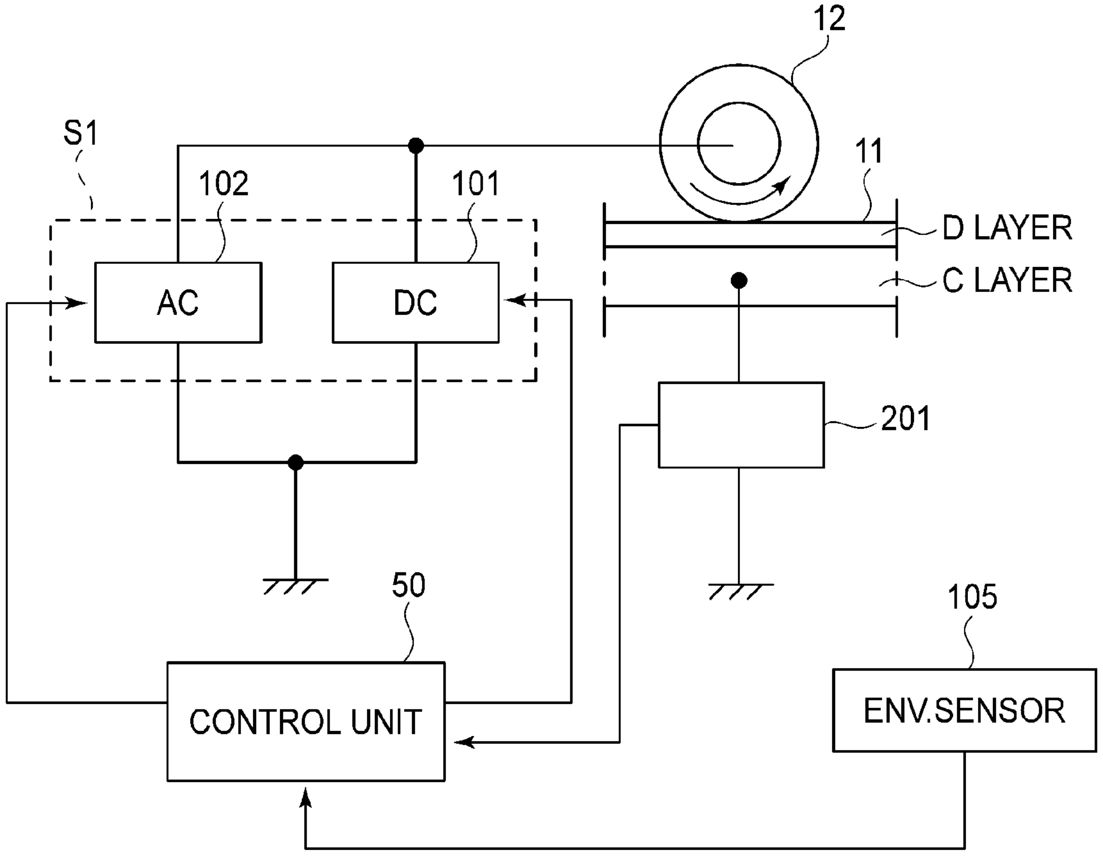
FIG. 4 is a block diagram of a charging bias applying system of the image forming apparatus in the embodiment.

FIG. 4 is a block circuit diagram of a charging bias application system with respect to the charge roller 12. The same constitution of the charging bias application system is employed with respect to all the image forming portions 10*a* to 10*d*.

A predetermined oscillating voltage in the form of a DC voltage biased (superposed) with an AC voltage having a frequency f (bias voltage: Vdc+Vac) is applied from the charging bias source S1 to the charge roller 12 via the core metal 2*a*. As a result, the peripheral surface of the rotating photosensitive drum 1 is charge-processed to a predetermined potential. The charging bias S1 as a voltage applying means for the charge roller 12 includes a DC power source 101 and an AC power source 102.

The control circuit (control circuit) 50 has a function of controlling the charging bias source S1 so that either one or both (the separation voltage of the DC voltage and the AC voltage and applied to the charge roller 2 by turning the DC power source 101 or/and the AC power source 102 of the charging bias source S1 on or off. The control unit 50 also has a function of controlling the DC voltage value applied from the DC power source 101 to the charge roller 12 and the peak-to-peak voltage value of the AC voltage applied from the AC power source 102 to the charge roller 12. To the control unit 50, from an AC current value measurement circuit 201 as a detecting means for measuring a value of AC current passing through the charge roller 12 via the photosensitive member 11, measured AC current value information is input. Further, to the control unit 50, detected environmental information is input from the environment sensor 105 as the environment detection means for detecting the environment in which the image forming apparatus 100 is disposed. From the AC current value information input from the AC current value measurement circuit 201 and the environmental information input from the environment sensor 105, the control unit 50 executes a program for operating and determining an appropriate peak-to-peak voltage value of the AC voltage to be applied to the charging roller 12 in the charging step. Thus, the control unit 50 functions as the adjusting means (charging high voltage control means) for adjusting the charging bias to be applied to the charging roller 12 during the image formation depending on the output from the AC current measurement circuit 201 or the like as the detecting means. Further, as specifically described later, the control unit 50 also functions as a setting means (charging frequency switching means) for setting a frequency of the AC voltage to be applied to the charging roller 12 in the charging step in the image forming process in each of image forming modes different in rotational speed of the photosensitive member 11.

(8) Discharge Current Amount Control

Next, a basic control method of the AC voltage in order to keep the discharge current amount at a constant level will be described. The peak-to-peak voltage of the AC voltage to be applied to the charging roller 12 during the image forming process is controlled by the control method as described below.

Figure 5:
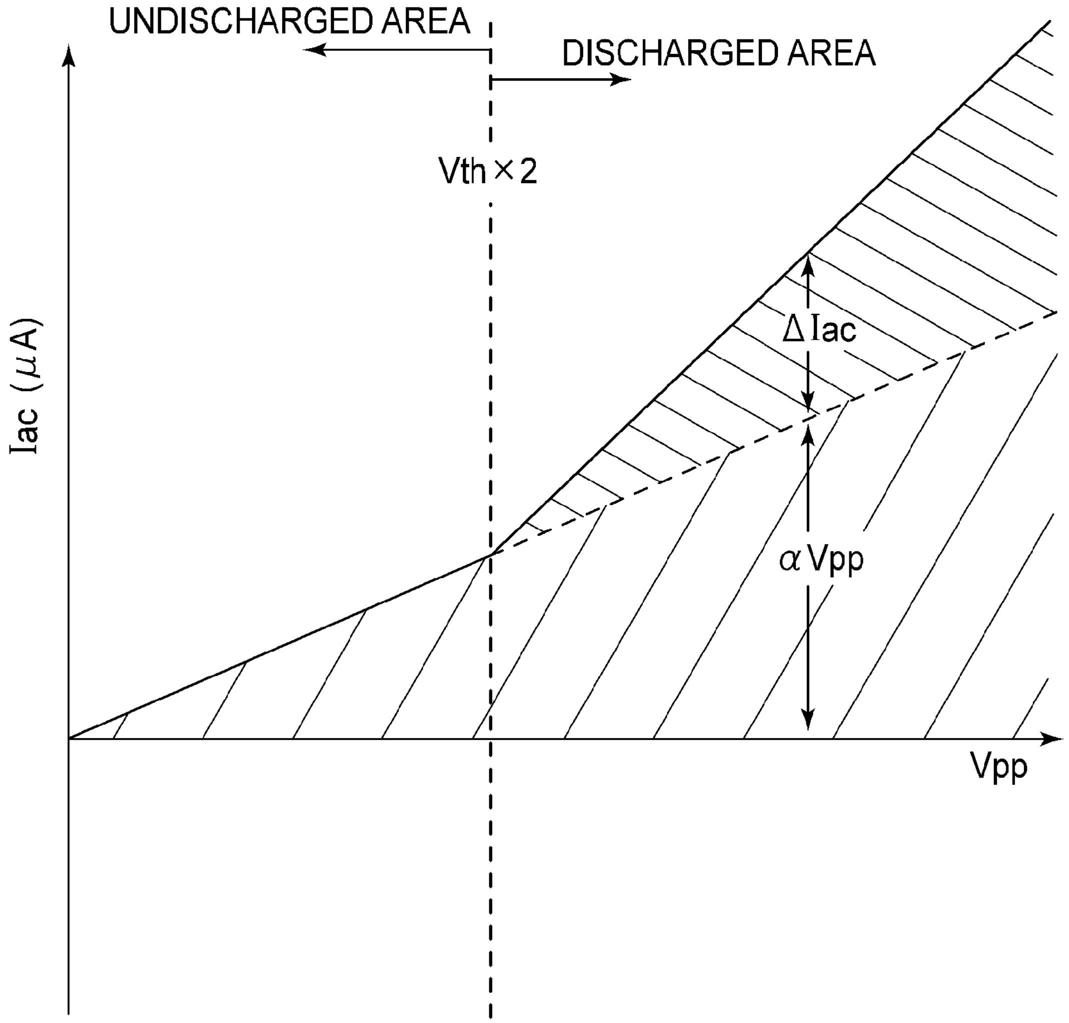
FIG. 5 is a schematic view for illustrating a measuring method of a discharge current amount.
Figure 6:
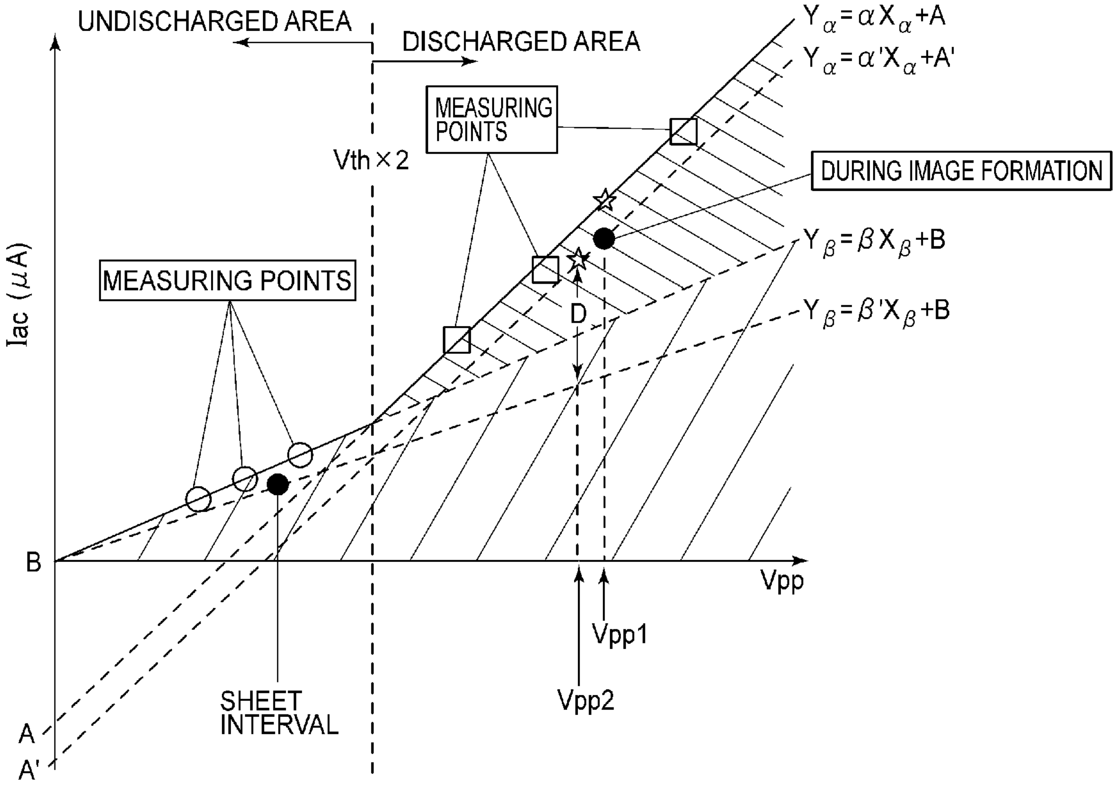
FIG. 6 is a schematic view for illustrating relational expressions between peak-to-peak voltages and AC current amounts measured in discharge current amount control.

It has been found that a discharge current value converted into numerical value according to a definition described below is used as a substitution for an actual amount of AC discharge and strongly correlated with abrasion of the photosensitive member 11, image deletion, and charging uniformity. As shown in FIG. 5, an AC current Iac has a linear relation to a peak-to-peak voltage Vpp in an area less than twice a value of discharge start voltage Vth, i.e., Vth×2 (V) (undischarged area) and is then linearly increased gradually in a discharged area with an increasing peak-to-peak voltage value. In a similar experiment in a vacuum, the linearity of Iac is kept also in the discharged area, so that the resultant increment of Iac is regarded as a discharge current increment ΔIac. Here, the discharge start voltage Vth means a voltage at which electric discharge starts between the charging roller and the photosensitive member.

When a ratio of the AC current Iac to the peak-to-peak voltage Vpp in the undischarged area less than Vth×2 (V) is taken as α, an AC current, other than the current due to discharge, such as a current flowing through a contact portion between the charging member and a member to be charged (hereinafter referred to a "nip current") is represented by α.Vpp. A difference ΔIac between the current value Iac measured during the application of a voltage equal to or more than Vth×2 (V) and the above value α.Vpp calculated according to the following formula 1 is defined as discharge current amount as a substitution for a discharge amount.

$$\Delta Iac = Iac - \alpha.Vpp \quad \text{(formula 1)}$$

The discharge current amount is changed depending on a change in environmental condition and an increase in amount of usage of the image forming apparatus in the case of performing the charging under control with a constant voltage or with a constant current. This is because a relationship between the peak-to-peak voltage and the discharge current amount and a relationship between the AC current value and the discharge current amount are changed.

In an AC constant current control method, the charging of the member to be charged is controlled by a total amount of current flowing from the charging member to the member to be charged. The total current amount is, as described above, a sum of the nip current α.Vpp and the discharge current amount ΔIac which is carried by the discharge at the non-contact portion. In the constant current control method, the charge control is effected by current including not only the discharge current which is current necessary to actually charge electrically the member to be charged but also the nip current.

For this reason, the discharge current amount ΔIac cannot be actually controlled. In the constant current control method, even in the case of effecting control at the same current value, depending on an environmental change of a material for the charging member, the discharge current amount is decreased when the nip current is increased and is increased when the nip current is decreased. For this reason, it is difficult to completely suppress a change (increase/decrease) in discharge current amount even by the AC constant current control method. When the lifetime of the image forming apparatus is intended to be prolonged, it is difficult to compatibly realize abrasion resistance of the photosensitive member 11 and the charging uniformity.

In this embodiment, in order to always obtain a desired discharge current amount, the control is effected in the following manner.

When the desired discharge current amount is taken as D, a method of determining the peak-to-peak voltage providing the discharge current amount D will be described.

In this embodiment, during the pre-rotation operation (rotation operation for image forming preparation), the operation/determination program for the appropriate peak-to-peak voltage value of the AC voltage to be applied to the charging roller 12 in the charging step during the image forming process is executed by the control unit 50.

Figure 7:
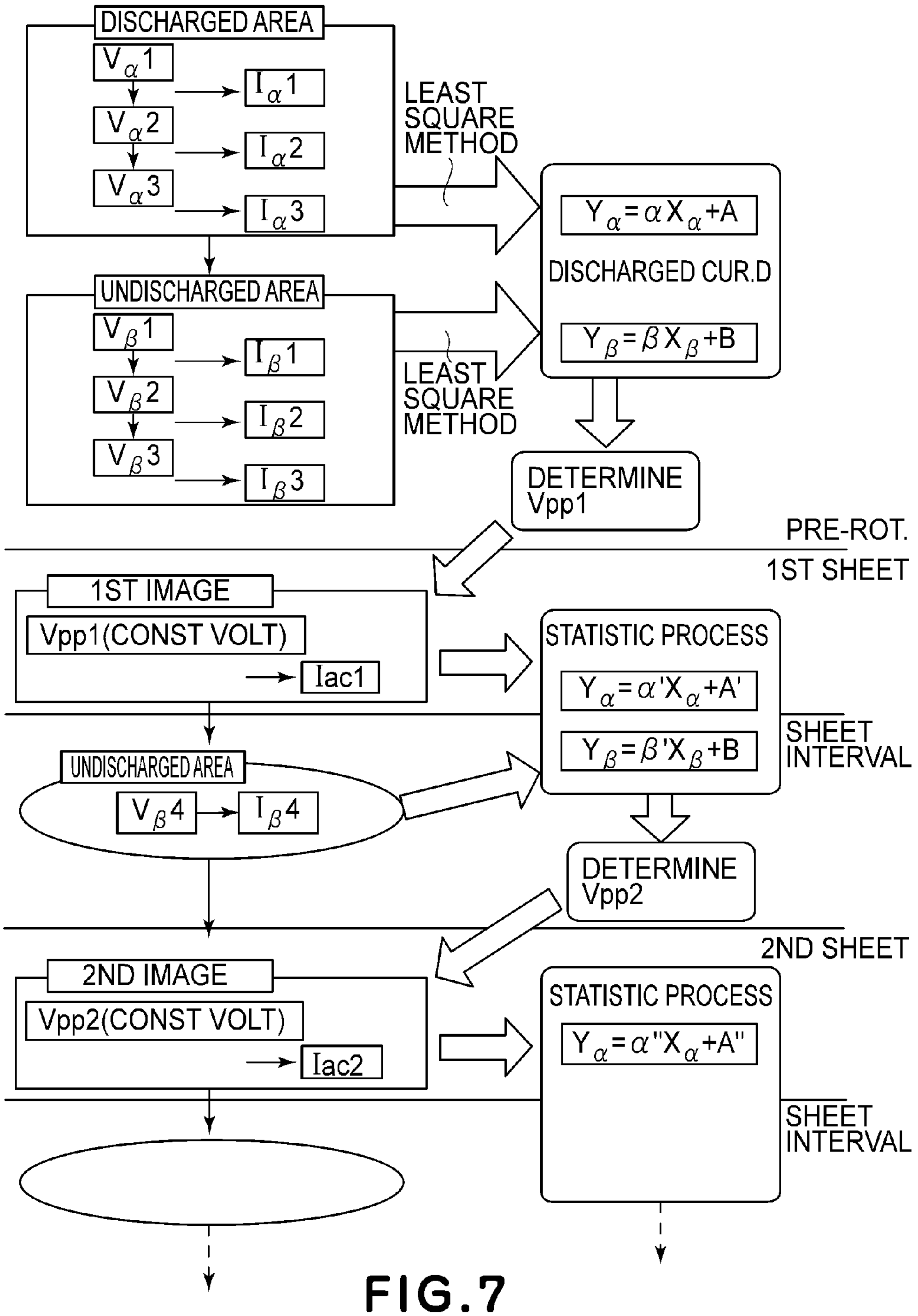
FIG. 7 is a schematic view for illustrating a sequence of the discharge current amount control.

FIG. 7 shows a relationship between the peak-to-peak voltage Vpp and the AC current Iac for illustrating the control in this embodiment (Vpp –Iac graph) and FIG. 7 shows a control flowchart of the control.

The control unit 50 controls the AC power source 102 during the pre-rotation operation so that three values of peak-to-peak voltages (Vpp) of the AC voltages in the discharged area and three values of peak-to-peak voltages (Vpp) of the AC voltages in the undischarged area are successively applied to the charging roller 12. The resultant values of AC current flowing into the charging roller 12 via the photosensitive member 11 are measured by the AC current value measurement circuit 201 and input into the control unit 50.

Next, the control unit 50 performs collinear approximation of a relationship between the peak-to-peak voltage and the AC current in the discharged area and the undischarged area, respectively, on the basis of the three measured values in the discharged area and the three measured values in the undischarged area by using least square method to obtain the following formulas 2 and 3.

(approximated line in discharged area)

$$Y_\alpha = \alpha X_\alpha + A \quad \text{(formula 2)}$$

(approximated line in undischarged area)

$$Y_\beta = \beta X_\beta + B \quad \text{(formula 3)}$$

Thereafter, the peak-to-peak voltage Vpp corresponding to the discharge current amount D is determined by formula 4 below as a difference between the approximated line in the discharged area (formula 2) and the approximated line in the undischarged area (formula 3).

$$Vpp1 = (D - A + B)/(\alpha - \beta) \quad \text{(formula 4)}$$

Here, a function fI1 (Vpp) showing a relationship between peak-to-peak voltage (Vpp) and AC current (Iac) in the undischarged area and a function fI2 (Vpp) showing a relationship between peak-to-peak voltage (Vpp) and AC current (Iac) in the discharged area correspond to formula 3 and formula 2, respectively. The constant D corresponds to the above-described desired discharge current amount D.

Accordingly, the discharge current amount D is represented by the formula below.

$$fI2(Vpp) - fI1(Vpp) = D$$

In other words, the discharge current amount D is represented by the formula below.

$$Y_\alpha - Y_\beta = \alpha X_\alpha + A) - (\beta X_\beta + B) = D$$

Further, the formula 4, i.e., Vpp=(D−A+B)/(α−β) can be derived from the formula for D, i.e., fI2 (Vpp)−fI1(Vpp)=D in the following manner.

The discharge current amount D is represented by the following formulas.

$$fI2(Vpp) - fI1(Vpp) = Y\alpha - Y\beta = D$$

$$(\alpha X_\alpha + A) - (\beta X_\beta + B) = D$$

Now, assuming that a value of X providing D is seeked and a resultant point is Vpp, the discharge current amount D is represented by the following formula.

$$(\alpha Vpp + A) - (\beta Vpp + B) = D$$

Accordingly, the peak-to-peak voltage Vpp is represented by the following formula.

$$Vpp = (D - A + B)/(\alpha - \beta)$$

Then, the peak-to-peak voltage applied to the charging roller 12 is switched to Vpp1 obtained according to the formula 4 described above, and the operation goes to the above described image forming process while effecting the constant voltage control with Vpp1.

During the image forming process, the peak-to-peak voltage Vpp 1 obtained as described above is applied to the charging roller 12, and a value of the AC current passing through the charging roller 12 at that time is measured by the AC current value measurement circuit 201 and input into the control unit 50. In this case, Vpp 1 is controlled with the constant voltage. In a non-image forming area between an image forming area and a subsequent image forming area (hereinafter referred to as a "sheet interval"), e.g., one AC voltage value of the peak-to-peak voltages (Vpp) in the undischarged area is applied to the charging roller 12, and a value of the AC current passing through the charging roller 12 at that time is measured by the AC current value measurement circuit 201 and input into the control unit 50. The control unit 50 performs statistical processing based on a newly measured relationship between the peak-to-peak voltage and the AC voltage value and the relationship between the peak-to-peak voltage and the AC voltage value measured during the pre-rotation operation to obtain formulas (5) and (6) below. That is, the control unit 50 adds measuring points during the image formation and the sheet interval to the measuring points in the control during the pre-rotation, thus increasing the number of the measuring points. The control unit 50 obtains the following formulas (5) and (6) by using the least square method.

(approximated line in discharged area)

$$Y_{\alpha'} = \alpha X_{\alpha'} + A \qquad \text{(formula 5)}$$

(approximated line in undischarged area)

$$Y_{\beta'} = \beta X_\beta + B \qquad \text{(formula 6)}$$

Thereafter, a peak-to-peak voltage Vpp 2 is determined similarly as in the case of Vpp 1 as the peak-to-peak voltage of the AC voltage applied to the charging roller 12 during the image forming process. Specifically, the peak-to-peak voltage Vpp 2 corresponding to the discharge current amount D is determined by formula 7 below as a difference between the approximated line in the discharged area (formula 5) and the approximated line in the undischarged area (formula 6).

$$Vpp\ 2 = (D - A' + B)/(\alpha' - \beta') \qquad \text{(formula 7)}$$

Here, a function fI1' (Vpp) showing a relationship between corrected peak-to-peak voltage (Vpp) and AC current (Iac) in the undischarged area and a function fI2' (Vpp) showing a relationship between peak-to-peak voltage (Vpp) and AC current (Iac) in the discharged area correspond to formula 6 and formula 5, respectively.

The deviation of the formula 7 from the functions fI1' (vpp) and fI2' (Vpp) is performed in the same manner as that of the formula 4 from the functions of fI1 (Vpp) and fI2 (Vpp). Also in a subsequent image forming process, the relationship between the peak-to-peak voltage and the AC current value is similarly measured during the image forming process and the sheet internal, so that the peak-to-peak voltage of the AC voltage to be applied to the charging roller 12 during the image forming process is always corrected during the image forming operation.

Thus, the peak-to-peak voltage necessary to obtain a predetermined discharge current amount D during the image forming process every time of the pre-rotation operation is calculated, and during the image forming process, the AC voltage of the obtained peak-to-peak voltage is applied to the charging roller while effecting the constant current control. Further, during continuous image formation, the AC current value during the image forming process and the AC current value at the time of applying the AC voltage of the peak-to-peak voltage in the undischarged area to the charging roller 12 during the sheet interval are measured, so that the peak-to-peak voltage of the AC voltage to be applied to a subsequent image forming process. As a result, it is possible to not only absorb manufacturing variation of the charging roller 12, fluctuation in resistance value due to an environmental change in material for the charging roller 12, and variation in high-voltage source of the apparatus main assembly but also make correction every image sheet with respect to the fluctuation in resistance value of the charging roller 12 by the continuous image formation. Therefore, it becomes possible to effect the control with a desired discharge current amount with reliability. Such a control method is referred herein to as "discharge current amount control".

(9) Charging Bias Control During Change in Image Forming Speed

The image forming apparatus 100 in this embodiment is operatable in a normal mode (first mode), as an image forming mode, in which the photosensitive member 11 is rotated at a first speed to effect image formation and in a low speed mode (second mode), as the image forming mode, in which the photosensitive member 11 is rotated at a second speed lower than the first speed to effect the image formation. In this embodiment, the normal mode is a mode for forming the image on plain paper and outputting the plain paper. Further, the low speed mode is a mode for forming the image on special paper (the transfer material including the papers having the large thickness and using a special material, such as thick paper, OHP sheet and glossy paper) and outputting the special paper. In this embodiment, the first speed is the lowest speed of a plurality of speeds set as the speed of the photosensitive member during the image formation.

An object of this embodiment is to properly suppress the charging condition of the photosensitive member at each of the image forming speeds in the case of changing the image forming speed and also to suppress a lowering in image productivity due to a control operation of the charging condition associated with the change in image forming speed. That is, in this embodiment, in the case where the process speed is changed to that in the normal mode with the plain paper and that in the low speed mode with the special paper, the discharge current amount control as a method of minimizing the discharge current amount under each of the conditions is effected.

Another object of this embodiment is to suppress a lowering in productivity due to an increase in down time problematic at a low speed operation in the discharge current amount control without lowering accuracy of the discharge current amount control. A specific object of this embodiment is to improve the image productivity in the case where a job using the plain paper (an image forming operation for forming the image on a single transfer material or a plurality of transfer materials according to a single start instruction) and a job using the special paper are successively performed.

The rotational speeds (peripheral speeds) of the photosensitive member 11 and the intermediary transfer belt 31 in the case of the image forming process using the special paper can be lowered to ½ of those in the case of the image forming process using the plain paper. However, the special paper includes various types of papers thus depending on the type of the special paper, the rotational speeds can also be lowered to ⅓ or ¼ of those in the case of the plain paper. The present invention is applicable to all these cases.

(10) Charging Bias Control System

Figure 8:
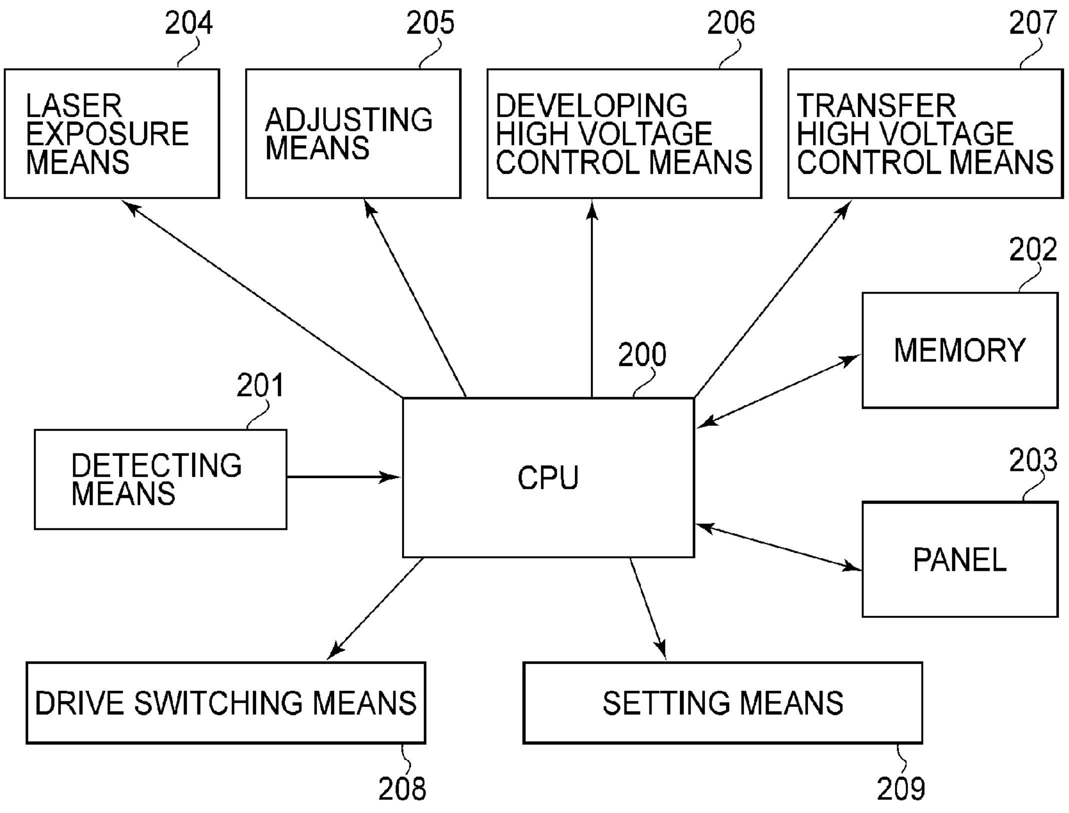
FIG. 8 is a block diagram showing a charging bias control system of the image forming apparatus in the embodiment.

FIG. 8 is a block diagram for specifically illustrating the charging bias control system in the image forming apparatus 100. In this embodiment, a CPU 200 as a principal element for the control is provided in the control unit 50. Further, in this embodiment, a circuit having functions of a laser exposure means 204, an adjusting means (charging high voltage control means) 205, a developing high voltage control means 206, a transfer high voltage control means 207, a drive switching means 208, and a setting means (charging frequency switching means) 209 is provided to the control unit 50. Further, to the control unit 50, a memory 202 as a storing means in which a program and data for the control executed by the control unit 50 are stored is provided. Further, to the CPU 200 of the control unit 50, a detecting means (AC current value measurement circuit or a charging roller current detecting means) 201 and an operating panel 203 as an input means, and the like are connected. The laser exposure means 204 controls light exposure by the laser scanner unit 13. The charging high voltage control means 205 controls the charging bias voltage to be applied from the charging bias source S1 to the charging roller 12. The developing high voltage control means 26 controls the developing bias voltage to be applied from the developing bias source S2 to the developing device 14. The transfer high voltage control means 207 controls the primary transfer bias voltage to be applied from the primary transfer bias voltage to be applied from the primary transfer bias source S3 to the primary transfer roller 35 and controls the secondary transfer bias voltage to be applied from the secondary transfer bias source (not shown) to the secondary transfer roller 36. The drive switching means 208 controls the driving means (driving motor) for each of the photosensitive member 11 and the intermediary transfer belt 31, thus controlling the rotational speed of each of the photosensitive member 11 and the intermediary transfer belt 31.

(11) Job Input in Image Forming Apparatus

In this embodiment, the case where the job using the plain paper and the job using the special paper are successively performed will be considered. That is, e.g., the case where a job for selecting plain paper (basis weight: 80 g/m$^2$) is designed and then a job for selecting the special paper such as thick paper (basis weight: 160 g/m$^2$) is designated through the operating panel 203 of the image forming apparatus 100 or the case where the job for selecting the special paper such as the thick paper is designated during execution of the job in which the plain paper is selected is considered. In these cases, from the CPU 200, a command for executing the job using the special paper successively after the execution of the job using the plain paper is transmitted to each of the above-described means to perform a switching operation of the image forming condition. That is, the command is transmitted to the laser exposure means 204, the adjusting means (charging high voltage control means) 205, the developing high voltage control means 206, the transfer high voltage control means 207, and the drive switching means 208. Incidentally, in addition to the designation of the job through the operating panel, the job may also be designated through an external terminal such as a personal computer (PC) or the like.

(12) Image Forming Operation

The image forming operation of the image forming apparatus 100 in this embodiment will be described based on the case where a plain paper job for forming the image on the plain paper (basis weight: 80 g/m$^2$) and a thick paper job for forming the image on the thick paper (basis weight: 160 g/m$^2$) are designated. The CPU 200 controls the printer as the image forming portion in accordance with the program stored in the memory 202 in the following manner.

Figure 16:
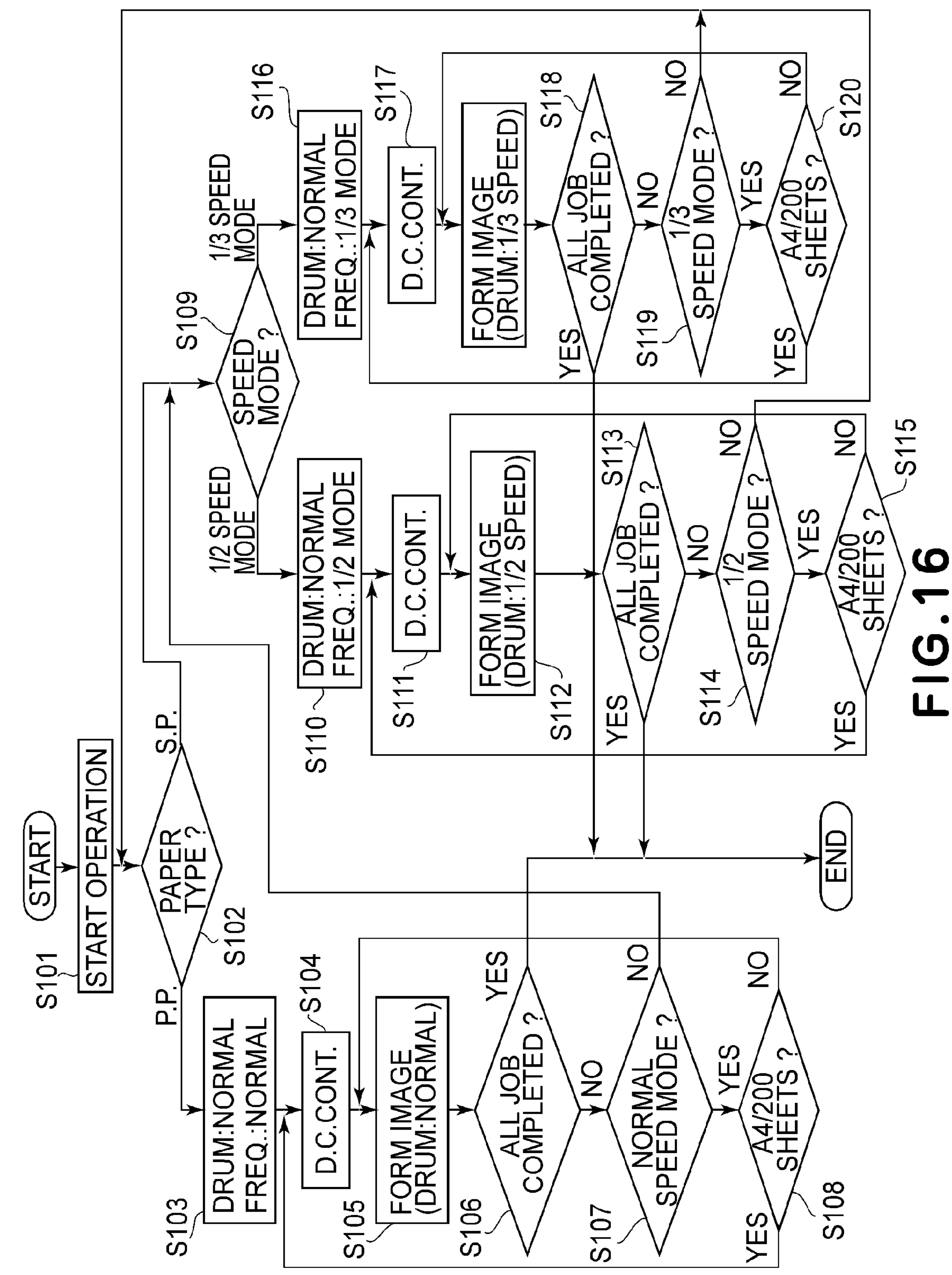
FIG. 16 is a flowchart showing a flow of an image forming operation in the embodiment of the present invention.

FIG. 16 is a flowchart showing a flow of the image forming operation of the image forming apparatus 100. First, through the operating panel 203, the image forming apparatus 100 receives an image forming operation start instruction (command) (job command) including a plurality of jobs (plain paper job and thick paper (special paper) job) and starts an operation for forming an image (S101). The co-presence of the plain paper job and the special paper job occurs in the case where the job using the special paper is continuous performed during successive execution of the job using the plain paper or occurs in the case where the job using the special paper is continuously performed after the job using the plain paper when the job using the plain paper is designated before the designation of the job using the special paper. In these cases, the jobs are generally performed continuously without stopping the rotations of the photosensitive member 11 and the intermediary transfer belt 31.

The CPU 200 judges whether the job is the job using the plain paper (P.P.) or the job using the special paper (S.P.) (S102). In the case where the paper (sheet) is the plain paper, the CPU 200 performs the processing in S103. In the case where the paper is the special paper (including the thick paper), the CPU 200 performs the processing in S109.

In this embodiment, the case where a continuous job (the plain paper job and the special paper job) is input will be described. In the case where the job is judged as the plain paper job in S102, the CPU 200 effects control so that the photosensitive member (drum) is rotated in a constant speed mode and a frequency of the charging bias to be applied to the charging roller is a frequency (2000 Hz) in the constant speed mode. In the case where the job for forming the image on the plain paper is input first, the image forming sequence may be started in the normal mode for the plain paper without effecting the discharge current amount control. In S104, the CPU 200 rotates the photosensitive member at the rotational speed (300 mm/s) set in S103 in the constant speed mode and effects the discharge current amount control at the AC voltage frequency set in S103 in the constant speed mode (as specifically described in (8) and (9)). Thereafter, the image forming apparatus effects image formation by rotating the photosensitive member at the rotational speed in the constant speed mode (S105). Then, the CPU 200 completes the image formation when all the outputs designated by the job in accordance with the job input in S101 are completed. In the case where all the outputs designated by the job are not completed, the CPU 200 executes the processing in S107 (S106). Then, the CPU 200 controls the operation of the image forming apparatus on the basis of whether or not subsequent image formation is effected in the constant speed mode determined depending on the type of the sheet subjected to the subsequent image formation. In the case where the CPU 200 judges that the subsequent image formation is also performed in the constant speed mode, the CPU 200 executes the processing in S108. In the case where the CPU 200 judges that the subsequent image formation is performed in the image forming mode other than the constant speed mode, the CPU 200 executes the processing in S109. Here, even in the job using the plain paper, the fluctuation in discharge current amount occurs depending on a temperature-rise state of the apparatus main assembly, an energization deterioration state of the charging member, and the like. For this reason, it is desirable that the discharge current amount control is effected on the basis of the integrated number of sheets subjected to the image formation (the print number in the continuous image formation). Therefore, in this embodiment, the number of sheets converted into A4-sized sheets is actually counted by the CPU 200 and the discharge current amount control (S104) is effected every continuous 200 sheets in terms of A4 conversion. The CPU 200 judges whether or not the integrated number is A4/200 sheets and in the case of the A4/200 sheets, executes the processing in S104. In the case other than the case of the A4/200 sheets, the CPU 200 executes the processing in S105. The integrated number of sheets subjected to the discharge current amount control is generally 100 to 1000 sheets and can be changed depending on the temperature-rise state of the image forming apparatus main assembly. In the case where the discharge current amount control is effected in the job using the plain paper as described above, the rotational speed (300 mm/s) of the photosensitive member 11 is not changed from that in the normal mode and the frequency of the charging AC voltage is also not changed from that (200 Hz) in the normal mode. Thereafter, in the case where the job is continued, after the discharge current amount control is completed, the image forming operation is resumed. The above-described processing from S104 to S108 is repeated until a subsequent sheet to be subjected to the image formation is paper other than the plain paper (paper for the image forming mode other than the constant speed mode) or until all the outputs by the designated job are completed.

In this embodiment, the case where the job using the plain paper and the job using the special paper are co-present is described. In the case where the plain paper job is successively performed after the thickness paper job, the CPU 200 executes the processing of S109 in S102. On the other hand, in the case where the thick paper job is successively performed after the plain paper job, the CPU 200 executes the processing of S109 after the image formation designated by the plain paper job is completed (S107).

Even in the case where the job using the plain paper and the job using the special paper are co-present, when the image formation start command (job command) is issued (S101), the CPU 200 judges whether the job is the job using the plain paper or the job using the special paper (S102). Then, in the case where the CPU 200 judges that the job is the job using the special paper, the CPU 200 judges whether the image forming mode is ½ speed mode or ⅓ speed mode (S109). In the case where the CPU 200 judges that the image forming mode is 1.2 speed mode, the charging AC frequency is changed to a ½ speed mode frequency of 1000 Hz. However, in this case, the rotational speed of the photosensitive member 11 is kept at that for the normal mode (S110). In the case where the image formation on the preceding sheet is performed in the image forming mode other than the ½ speed mode, the CPU 200 rotates the photosensitive member at the normal mode rotational speed set in S110 and applies a test bias with the ½ speed mode frequency (1000 Hz), thus effecting the discharge current amount control (S111). Further, in the case where the image formation on the preceding sheet is performed in the ½ speed mode (in the case where the preceding step is S115), the CPU 200 rotates the photosensitive member at the rotational speed in the ½ speed mode and applies the test bias with the ½ speed mode frequency, thus effecting the discharge current amount control (S111). When the image forming mode is changed, the photosensitive member is rotated at the constant speed mode rotational speed higher than the ½ speed mode rotational speed. However, when the image is continuously formed in the ½ speed mode, it takes time until the rotational speed of the photosensitive member is stabilized, the down time during the continuous image formation can be reduced by rotating the photosensitive member at the ½ speed mode rotational speed (150 mm/s).

Then, the CPU 200 rotates the photosensitive member at the ½ speed mode rotational speed (150 mm/s) and applies the charging bias with the ½ speed mode frequency (1000 Hz), thus effecting the image formation (S112). In the case where the image formation on the preceding sheet is not performed in the ½ speed mode, in order to start the image forming operation in the ½ speed mode, the rotational speed of the photosensitive member 11 is switched into the ½ speed.

Then, in accordance with the job input in S101, when all the outputs designated by the job are completed, the CPU 200 ends the image formation. In the case where all the outputs designated by the job are not completed, the CPU 200 executes the processing in S114 (S113). Then, the CPU 200 controls the operation of the image forming apparatus on the basis of whether or not the subsequent image formation is performed in the ½ speed mode depending on the type of the sheet subjected to the image formation. In the case where the CPU 200 judges that the (subsequent) image forming mode is the ½ speed mode, the CPU 200 executes the processing in S112. Further, in the case where the CPU 200 judges that the image forming mode is a mode other than the constant speed mode, the CPU 200 executes the processing in S112. Further, similarly as in the case of the plain paper, the A4 conversion sheet number is actually counted by the CPU 200, and the CPU 200 controls the operation so as to effect the discharge current amount control (S111) every continuous 200 sheets. The CPU 200 judges whether the A4 conversion sheet number is continuous 200 sheets or not. When the sheet number is continuous 200 sheets, the processing of S111 is performed. When the sheet number is not continuous 200 sheets, the processing of S112 is performed. Further, similarly as in the case of the plain paper, in the case where the image is continuously formed in the ½ speed mode, the rotational speed of the photosensitive member 11 is not changed from the speed in the ½ speed mode and the charging AC frequency is also not changed from the frequency in the ½ speed mode. Thereafter, in the case where the job is continued, after completion of the discharge current amount control, the image forming operation is resumed. The above-described processing from S111 to S115 is repeated until all the outputs by the job are completed.

The above-described processing is that performed in the case where the image forming mode is the ½ speed mode. The processing from S116 to S120 is substantially identical to that from S110 to S115 except that the photosensitive member rotational speed and the frequency to be applied to the charging roller are the ⅓ speed mode rotational speed (100 mm/s) and the ⅓ speed mode frequency (667 Hz), thus being omitted from explanation.

Figure 9:
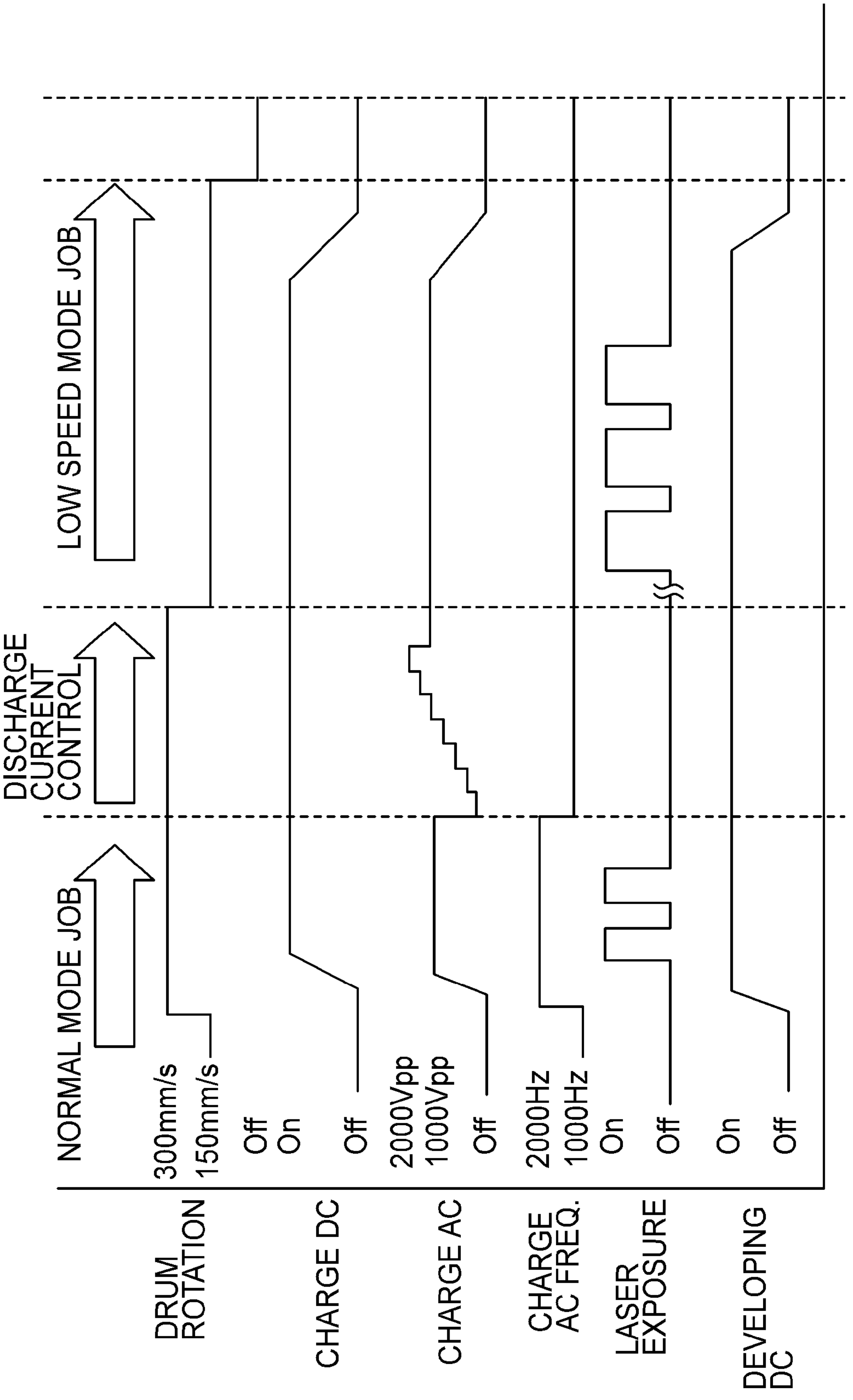
FIG. 9 is a time chart showing an operation of the image forming apparatus during switching from a normal mode to a low speed mode in the embodiment of the present invention.

With reference to FIG. 9, a flow of a switching operation of the image forming mode in this embodiment will be described more specifically.

When the job using the plain paper, i.e., the job in the normal mode is started, first, the rotational drive of the photosensitive member 11 and the intermediary transfer belt 31 is started. The rotational speeds of the photosensitive member 11 and the intermediary transfer belt 31 in the normal mode are set at 300 mm/s. When the rotational speed of the photosensitive member 11 is stabilized at the predetermined speed, the charging DC voltage and the charging AC voltage are applied at the substantially same time. Here, until the photosensitive member 11 is stabilized at the predetermined speed, the photosensitive member 11 is rotated about 5-full-circumference but an appropriate value is different depending on the diameter of the photosensitive member 11 and the type of the motor. Generally, the number of turn of the photosensitive member 11 is 3-full-circumference to 7-full-circumference. Further, depending on the type of paper selected through the operating panel 203, the charging frequency is changed to that in the normal mode, i.e., 2000 Hz in this embodiment before the charging AC voltage is applied.

Then, application of the developing DC voltage to the developing sleeve of the developing device 14 is started by the developing high voltage control means 206 with timing immediately before the surface of the photosensitive member 11 electrically charged by the charging roller 12 supplied with the charging DC voltage and the charging AC voltage passes through the developing device 14.

Then, all the charging DC voltage, the AC voltage, and the developing DC voltage are increased to set values and stabilized and then the laser exposure by the laser exposure means 204 is started, so that formation of the latent image on the photosensitive member 11 is started. The time required for increasing all the charging DC voltage, the AC voltage, and the developing DC voltage to the set values is about 100 to 500 mms. In this embodiment, these voltages are regarded as being stabilized with 300 mms and then the image formation is started. Thereafter, the operation goes to the job using the special paper, i.e., the low speed mode (e.g., ½ speed mode). In the case where the image forming process in the low speed mode is continued after that in the normal mode, the discharge current amount control has been conventionally effected before the operation goes to the image forming process in the low speed mode. This is, as described above, for the following reason. That is, in the low speed mode, in order to suppress the deterioration of the photosensitive member 11, the charging frequency is switched depending on the rotational speed of the photosensitive member 11 by the setting means (the charging frequency switching means) 201. Therefore, it is difficult to estimate the discharge amount, so that the discharge current amount in the low speed mode is required to be controlled again.

Figure 10:
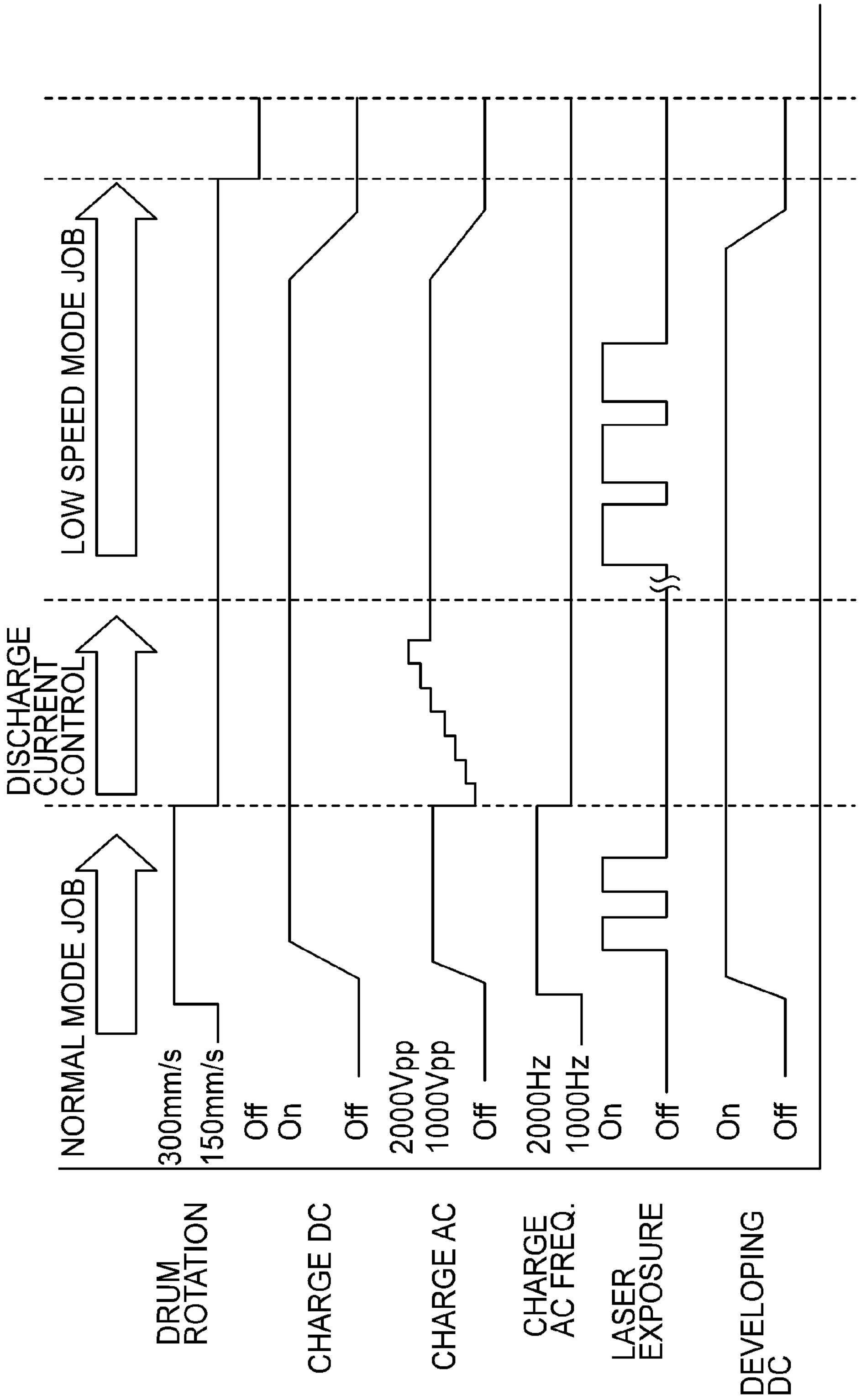
FIG. 10 is a time chart showing an operation of an image forming apparatus during switching from the normal mode to the low speed mode in a conventional embodiment of the image forming apparatus.

As shown in FIG. 10, in a conventional method, when the discharge current amount control is effected before the image forming process in the normal mode was shifted to that in the low speed mode, the rotational speed of the photosensitive member 11 was lowered from 300 mm/s to 150 mm/s first and then the discharge current amount control was started.

Figure 15:
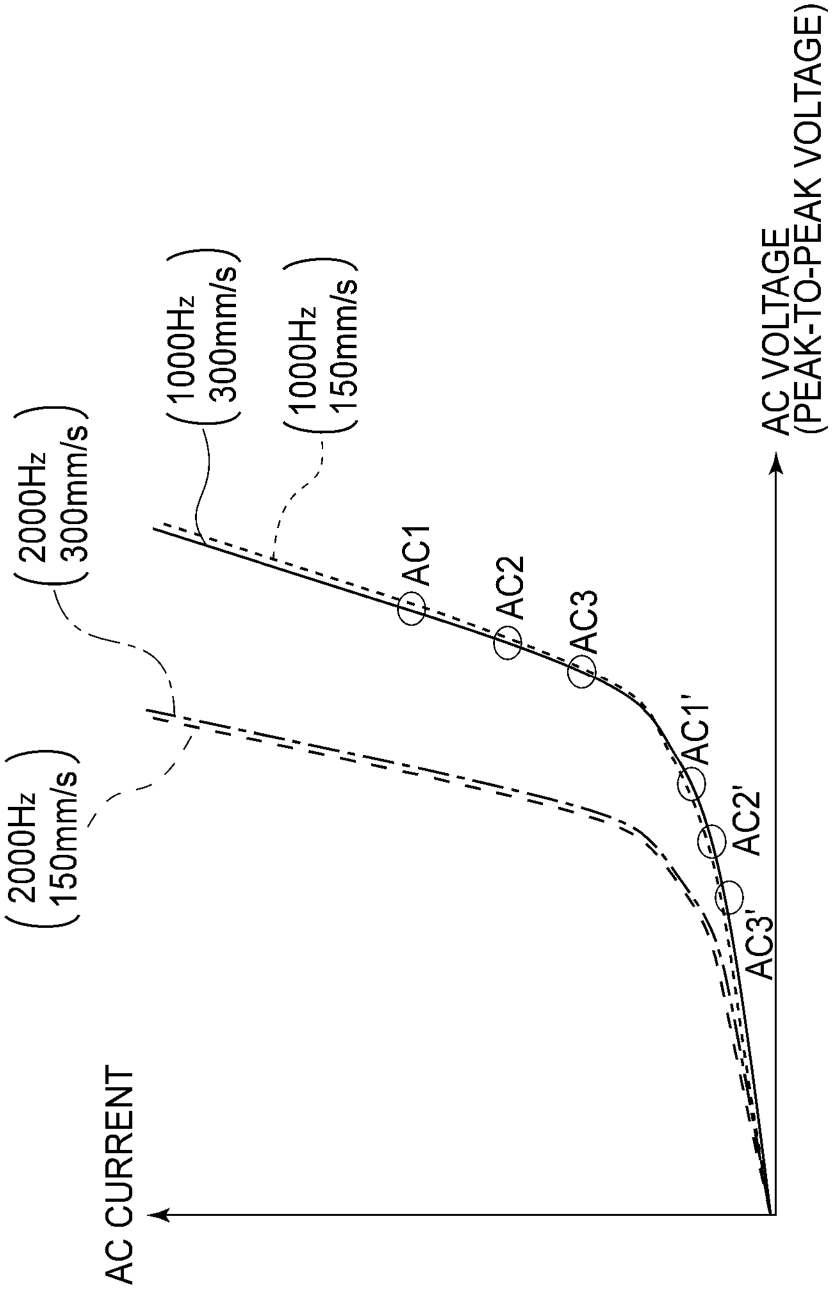
FIG. 15 is a graph showing a relationship between a charging AC voltage and an AC current when a rotational speed of a photosensitive member and the charging frequency are changed.

On the other hand, in this embodiment, as shown in FIG. 9, the rotational speed of the photosensitive member 11 is not lowered and kept at the speed in the normal mode, i.e., 300 mm/s. During the discharge current amount control, only the charging frequency is lowered from 2000 Hz to 1000 Hz which corresponds to that in the low speed mode. This is because detected values of the charging AC voltage and the charging AC current amount do not depend on the rotational speed of the photosensitive member 11. The detected AC current amount is defined as an amount per unit time of a current flowing from the charging roller 12 to the photosensitive member 11. A relationship between the charging AC voltage and the charging AC current when each of the charging frequency and the rotational speed of the photosensitive member 11 is switched is shown in FIG. 15. From the figure, it is understood that the relationship between the charging AC voltage and the charging AC current does not depend on the rotational speed of the photosensitive member 11 but depends only on the charging frequency.

(13) Time Required for Discharge Current Amount Control

Then, advantages in control time when the discharge current amount control before the image forming process in the low speed mode is effected still in the normal mode in the case where the image forming process in the normal mode and that in the low speed mode are successively performed will be described.

In this embodiment, the relationship between the peak-to-peak voltage and the AC current amount is measured during the image forming process in the above-described manner to control the peak-to-peak voltage of the AC voltage applied to the charging roller 12, so that the discharge current amount is controlled. Specifically, in the sheet intervals, the AC current values can be measured by, e.g., providing at least two measuring points for the charging AC voltage values in each of the discharged area and the undischarged area. Then, through the collinear approximation, by dividing the slope of the line in the discharged area by the slope of the line in the undischarged area, it is possible to determine a value of the charging AC voltage providing a desired discharge amount. As described above, the following formulas (5) and (6) are the approximate expressions for calculating the discharge current amount.

$$Y_{\alpha'}=\alpha X_{\alpha'}+A \quad \text{(formula 5)}$$

(approximated line in undischarged area)

$$Y_{\beta'}=\beta X_{\beta}+B \quad \text{(formula 6)}$$

In this embodiment, in order to further enhance accuracy, when each of the formulas (5) and (6) is calculated, in each of the discharged area and the undischarged area, three measuring (sampling) points, i.e., six measuring (sampling) points in total are provided for the charging AC voltage values, so that the operation for detecting the AC current is performed. The sampling time for each of the sampling points may desirably be a time corresponding to one-full-circumference of the photosensitive member 11 and may be at least a time corresponding to one-full-circumference of the charging roller 12. Specifically, in this embodiment, the sampling was effected by using three measuring points of 600 Vpp, 700 Vpp and 800 Vpp in the undischarged area and using three measuring points of 1500 Vpp, 1600 Vpp and 1700 Vpp in the discharged area. In this embodiment, the peak-to-peak voltage of the test bias applied to the charging roller 12 in a test mode for adjusting the charging bias to be applied in the normal mode is equal to that in a test mode for adjusting the charging bias to be applied in the low speed mode.

Figure 11:
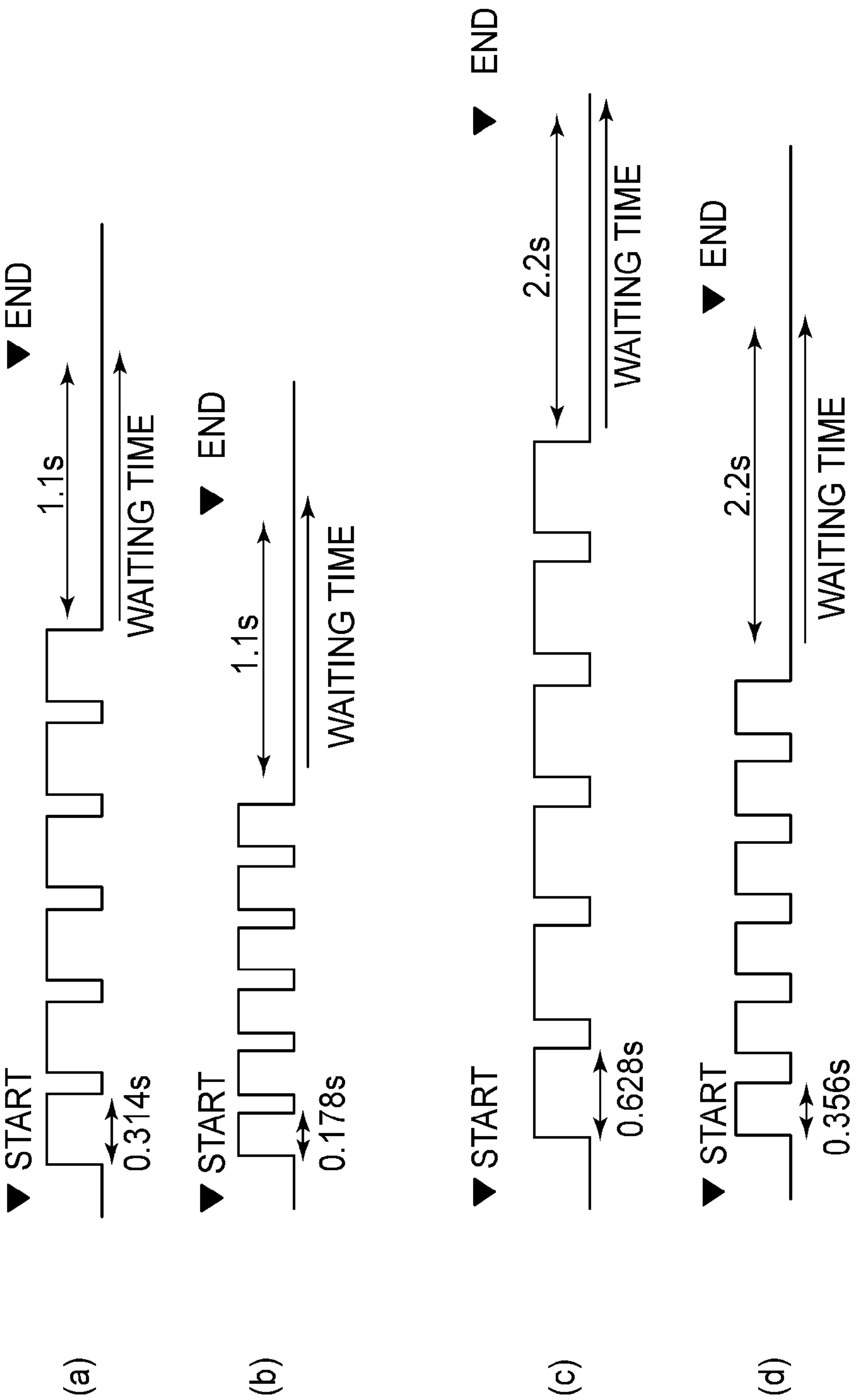
FIGS. 11(*a*) to 11(*d*) are time charts for illustrating a difference in time required for the discharge current amount control between the control in the present invention and conventional control.

In the case where the measurement is effected at the three points in the discharged area and at the three points in the undischarged area as in this embodiment, operations which influence on the control time are as shown in FIGS. 11(*a*) to 11(*d*). First, the case where one sampling time corresponds to one-full-circumference of the photosensitive member 11 will be considered (FIG. 11(*a*)). In this case, when the discharge current amount control is effected with the speed (300 mm/s) of the photosensitive member 11 in the normal mode, a sampling operation (detection time) with 0.314 s corresponding to one-full-circumference of the photosensitive member 11 per (one) sampling time is required 6 times. Further, an AC voltage switching time of 0.05 e between adjacent sampling operations is required 5 times. Further, a wait time of 1.1 s for awaiting conveyance of a toner band generated on the photosensitive member 11, by an unstable area of a potential difference between the set charging AC voltage and the set developing high voltage during switching of the charging AC voltage (a so-called fluctuation of Vback), to the secondary transfer portion Te so as not to influence subsequent image formation is also required.

Next, the case where one sampling time corresponds to one-full-circumference of the charging roller 12 will be considered (FIG. 11(*b*)). In this case, when the discharge current amount control is effected with the speed (300 mm/s) of the photosensitive member 11 in the normal mode, a sampling operation (detection time) with 0.178 s corresponding to one-full-circumference of the charging roller 12 per (one) sampling time is required 6 times. Further, an AC voltage switching time of 0.05 e between adjacent sampling operations is required 5 times. Further, a wait time of 1.1 s for awaiting conveyance of a toner band generated on the photosensitive member 11, by the above-described fluctuation of Vback, to the secondary transfer portion Te so as not to influence subsequent image formation is also required.

Similarly, the time required for the discharge current amount in the case where the rotational speed of the photosensitive member 11 is changed to the rotational speed (150 mm/s) in the low speed mode is shown in FIG. 11(*c*) for sampling corresponding to one-full-circumference of the photosensitive member 11 and FIG. 11(*d*) for sampling corresponding to one-full-circumference of the charging roller 12. In the case where the discharge current amount control is effected with the rotational speed of the photosensitive member 11 in the low speed mode, each of the sampling time and the wait time (conveying time of the toner band conveyed to the secondary transfer portion Te) is about two times that in the case where the discharge current amount control is effected with the rotational speed of the photosensitive member 11 in the normal mode. The AC voltage switching time between adjacent two sampling operations is substantially constant, irrespective of the speed of the photosensitive member 11.

The control times in the cases shown in FIGS. 11(*a*) to 11(*d*) are summarized in Table 1 below.

TABLE 1

| Speed mode | Sampling time | Detection time(s) | Switching time(s) | Wait time(s) | Total time(s) |
|---|---|---|---|---|---|
| Normal | *1 P.M.O.F.C. | 0.314 | 0.05 | 1.1 | 3.234 |
| Normal | *2 C.R.O.F.C. | 0.178 | 0.05 | 1.1 | 2.418 |
| Low | P.M.O.F.C. | 0.628 | 0.05 | 2.2 | 6.218 |
| Low | C.R.O.F.C. | 0.356 | 0.05 | 2.2 | 4.586 |

*1: P.M.O.F.C. represents a photosensitive member one-full-circumference.
*2: C.R.O.F.C. represents a charging roller one-full-circumference.

In this embodiment, the discharge current amount control was effected with the sampling time, for the discharge current value, corresponding to one-full-circumference of the charging roller 12. For that reason, the time required for the discharge current amount control is only about 2.4 seconds when the control is effected with the rotational speed (300 mm/s) of the photosensitive member 11 in the normal mode. Even in the case where one sampling time for the discharge current value corresponds to one-full-circumference of the photosensitive member 11, the control time is only about 3.2 seconds.

On the other hand, in the case where the discharge current amount control is effected with the rotational speed (150 mm/s) of the photosensitive member 11 in the low speed mode, the time required for the discharge current amount control is about 4.6 seconds even when one sampling time corresponds to one-full-circumference of the charging roller 12. Further, when one sampling time corresponds to one-full-circumference of the photosensitive member 11, the discharge current amount control takes about 6.2 seconds. Therefore, as in this embodiment, by effecting the image formation in which the rotational speeds of the photosensitive member 11 and the intermediary transfer belt 31 are kept at 300 mm/s in the normal mode during the charge control and then one changed to 150 mm/s in the low speed mode, the (total) control time can be reduced compared with the conventional control method.

In this embodiment, by utilizing such a property that the relationship between the charging AC voltage and the charging AC current, i.e., a so-called V-I characteristic, is not changed, the discharge current amount control is effected with the speed of the photosensitive member 11 as high as possible. The above-described toner band generated during the discharge current amount will be further described. Generally, in the case where the discharge current amount control is effected, the charging AC voltage is divided into a plurality of measuring (sampling) points, so that at each of the points, the potential of the photosensitive member 11 is not stabilized. As a result, the relationship between the photosensitive member 11 potential and the developing potential, i.e., the so-called Vback, is unstable. Therefore, bands of the carrier and the toner are generated on the photosensitive member 11 and are transferred onto the intermediary transfer belt 31 to reach the secondary transfer portion Te. At the secondary transfer portion Te, by an urging force of the secondary transfer roller 36 against the intermediary transfer belt 31, the toner and the carrier are deposited on the secondary transfer roller 36. Then, the deposited toner and carrier are moved back toward the intermediary transfer belt 31 for a time, during which the image formation is effected. Thus, when the image on the intermediary transfer belt 31 reaches the secondary transfer portion Te, a problem of backside contamination of the transfer material S is caused to occur. There is a possibility that the toner and the carrier which are deposited on the secondary transfer roller 36 are efficiently removed but it is difficult to remove the deposited toner and carrier instantaneously. It is also possible to employ a method in which the toner is made less liable to deposit on the secondary transfer roller 36 by applying a (reverse) bias of an opposite polarity to a polarity for the bias to be applied to the secondary transfer roller during the image formation. However, when the function of applying the reverse bias is provided to the high voltage source, the constitution can be disadvantageous from the standpoint of cost and there is possibility that the polarity-inverted toner is deposited on the secondary transfer roller 36 when it reaches the secondary transfer portion Te.

In this embodiment, in the image forming apparatus 100, the secondary transfer portion Te has the function of applying the reverse bias, so that the toner is less liable to deposit on the secondary transfer portion Te. However, in consideration of the polarity-inverted toner as described above, the speeds of the photosensitive member 11 and the intermediary transfer belt 31 are not switched to those in the low speed mode but are kept at the values in the normal mode until the toner band reaches the secondary transfer portion Te after the discharge current amount control is completed. Thus, the time of switching the speed of the photosensitive member 11 and the intermediary transfer belt 31 to the speed thereof in the low speed mode is delayed, so that a toner band elimination time can be reduced not only during the discharge current amount control but also at the time of the end of the discharge current amount control. As described above, after the discharge current amount control with the reduced time is effected, the operation goes to the image forming process in the low speed mode. In this case, the charging frequency has already been lowered to 1000 Hz during the discharge current amount control, so that the charging frequency is not switched and only the rotational speed of the photosensitive member 11 and the intermediary transfer belt 31 is changed to the rotational speed (150 mm/s) in the low speed mode. Thereafter, the image forming operation or the like by the laser light exposure is performed, thus going to the end of the job or a subsequent job.

As described above, in this embodiment, the setting means (the charging frequency switching means) 209 sets the charging bias frequency at a first frequency in a first mode (the normal mode) in which the photosensitive member 11 is rotated at a first speed to effect the image formation. Further, the setting means 209 also sets the charging bias frequency at a second frequency in a second mode (The low speed mode) in which the photosensitive member 11 is rotated at a second speed lower than the first speed to effect the image formation. The detecting means (the charging roller current detecting means) 201 detects the current flowing from the charging roller 12 to the photosensitive member 11 when the test mode in which the test bias (the bias during the discharge current amount control) is applied to the charging roller 12. Further, the adjusting means (the charging high voltage control means) 205 adjusts the charging bias to be applied during the image formation depending on an output of the detecting means 201. In this embodiment, when the test mode for adjusting the charging bias to be applied in the second mode by setting the test bias frequency at the second frequency, the photosensitive member 11 is rotated at the first speed. Further, in this embodiment, when the test mode for adjusting the charging bias to be applied in the first mode by setting the test bias frequency at the first frequency, the photosensitive member 11 is rotated at the first speed.

As described above, in this embodiment, when the image forming job is shifted from the job using the plain paper to the job using the special paper, the charging AC frequency is switched depending on the photosensitive member speed in order to suppress the deterioration of the photosensitive member. According to this embodiment, in the case where both of the above-described jobs are successively performed, even when the charging AC frequency is switched, it is possible to efficiently perform control, in a very short time, capable of keeping the charging condition such as the charging AC current amount or the discharge current amount at a constant level. That is, according to this embodiment, it is possible to improve the image productivity in the case where the job using the plain paper and the job using the special paper are successively performed. Therefore, according to this embodiment, in the case where the image forming speed is changed, it is possible to not only properly suppress the charging condition of the photosensitive member at each of the image forming speeds but also suppress the lowering in image productivity due to the control operation of the charging condition varying depending on the change in image forming speed.

[Embodiment 2]

In Embodiment 1, the case where the job using the plain paper and the job using the special paper are successively performed is described. In this embodiment, the case where the job using the special paper is started from a stand-by state will be described. Basic constitution and operation of the image forming apparatus in this embodiment are identical to those in Embodiment 1, thus being omitted from redundant explanation by using the same reference numerals or symbols.

The image forming apparatus in this embodiment is capable of effecting the discharge current amount control similarly as in Embodiment 1 during pre-rotation even in the case where the job using the special paper is started from the stand-by state. That is, the discharge current amount control can be effected by rotating the photosensitive member 11 and the intermediary transfer belt 31 at the rotational speed (for the normal mode) higher than the rotational speed for the low speed mode after the charging frequency is set at that for the low speed mode.

Referring to FIG. 8, in the case where a job command for selecting the thick paper (basis weight: 160 g/m$^2$) is provided through the operating panel 203, from the CPU 200, a command for executing the job using the thick paper, i.e., a low speed mode job is transmitted to each of the following means to perform a switching operation of the image forming condition. That is, the command is transmitted to the laser exposure means 204, the adjusting means (charging high voltage control means) 205, the developing high voltage control means 206, the transfer high voltage control means 207, and the drive switching means 208.

(14) Another image forming operation

Figure 17:
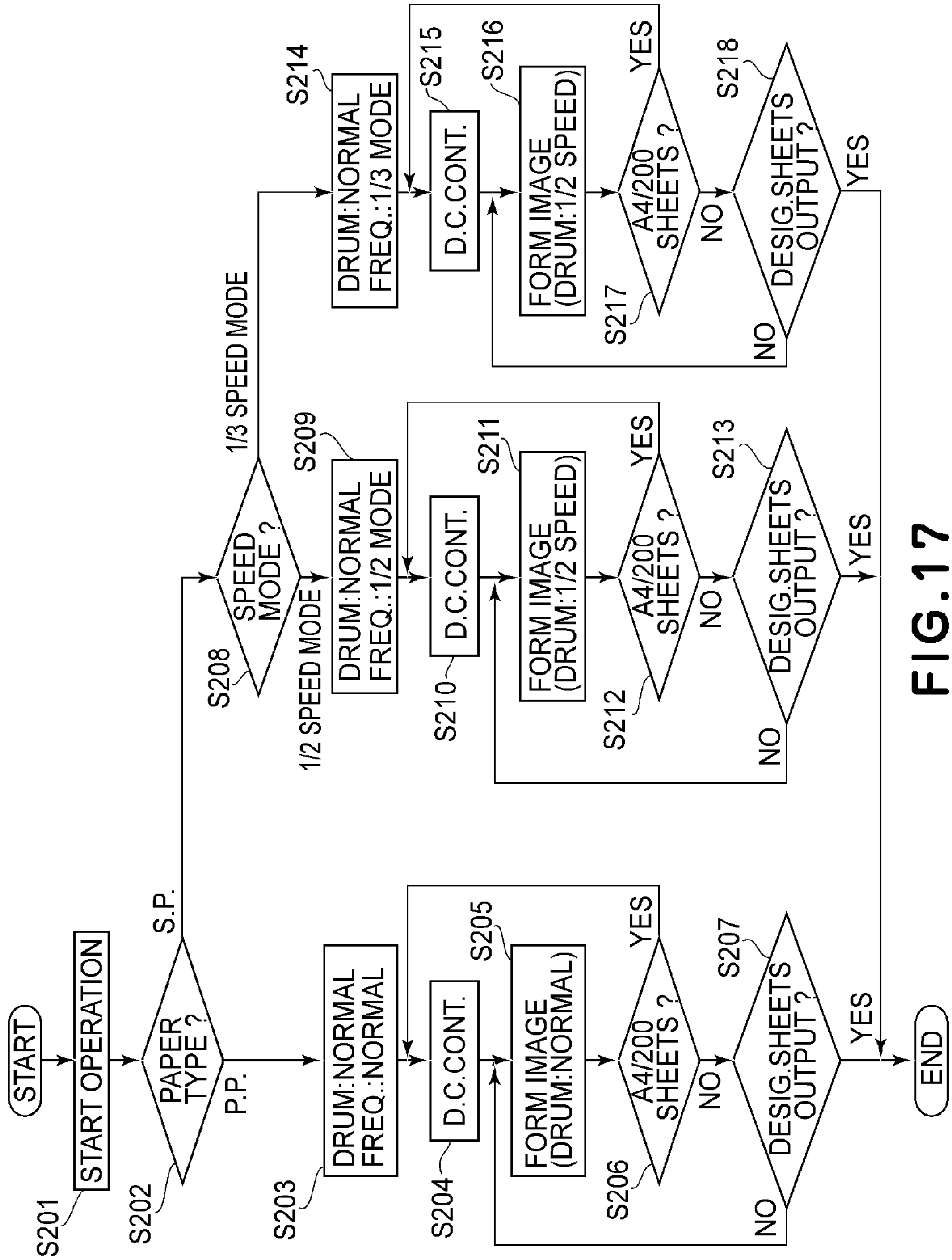
FIG. 17 is a flowchart showing a flow of an image forming operation in another embodiment of the present invention.

FIG. 17 is a flowchart showing a flow of the image forming operation of the image forming apparatus 100.

The control flow in this embodiment will be described with reference to the flowchart in FIG. 17. The CPU 200 controls the image forming operation in accordance with the program stored in the memory 202 along the flowchart shown in FIG. 17. First, through the operating panel 203, an image forming operation start instruction (command) (job command) is provided (S201), the CPU 200 judges whether the job is the job using the plain paper (P.P.) or the job using the special paper (S.P.) (S202). The case where the job using the plain paper from the stand-by state is set through the operating panel 203 will be described. In the case where the job is judged as the plain paper job, the CPU 200 performs the processing in S203. In the case where the job is judges as the special paper job, the CPU 200 performs the processing in S208.

The image forming apparatus which has been placed in the stand-by state starts rotation of the photosensitive member in accordance with the input of the plain paper job. After, the photosensitive member is rotated, the discharge current amount control is effected in accordance with the input image forming signal (the image signal during the plain paper job) by a period in which the image formation is effected. The CPU 200 sets the photosensitive member rotational speed at the rotational speed (300 mm/s) in the constant speed mode and sets the frequency of the AC voltage applied to the charging roller at the frequency (2000 Hz) in the constant speed mode (S203). Then, the CPU 200 rotates the photosensitive member at the constant speed mode speed (30 mm/s) set in S203 and effects the discharge current amount control by applying a test bias at the constant speed mode frequency. Incidentally, without effecting the discharge current amount control, it is also possible to start the image forming sequence in the normal mode with respect to the plain paper. After the discharge current amount control is effected, the CPU 200 rotates the photosensitive member at the constant speed mode speed and applies the charging bias with the peak-to-peak voltage Vpp set by the discharge current amount control at the constant speed mode frequency to the photosensitive member, so that the photosensitive member is electrically charged to effect the image formation (S206). Here, the fluctuation in discharge current amount occurs depending on a temperature-rise state of the apparatus main assembly, an energization deterioration state of the charging member, and the like. For this reason, it is desirable that the discharge current amount control is effected on the basis of the integrated number of sheets subjected to the image formation (the print number in the continuous image formation). Therefore, in this embodiment, the number of sheets converted into A4-sized sheets is counted by the CPU 200 and the discharge current amount control is effected every continuous 200 sheets in terms of A4 conversion (S204).

During the discharge current amount control effected every 200 sheets, the rotational speed of the photosensitive member is not changed. This is because it takes time until the photosensitive member rotational speed is stabilized when the rotational speed of the photosensitive member is changed, so that the down time can be reduced during the continuous image formation by rotating the photosensitive member at the constant speed mode rotational speed (300 mm/s). Thereafter, in the case where the image formation on the sheets designated by the job input in S201 is completed, the CPU 200 ends the image formation and places the image forming apparatus in the stand-by state.

Next, the case where the job using the special paper is set in S201 will be described.

Also in this case, when the image formation start command (job command) is issued (S201), the CPU 200 judges whether the job is the job using the plain paper or the job using the special paper (S202). Then, in the case where the CPU 200 judges that the job is the job using the special paper, the CPU 200 judges whether the image forming mode is ½ speed mode or ½ speed mode (S208). In the case where the CPU 200 judges that the image forming mode is 1.2 speed mode, the charging AC frequency is changed to a ½ speed mode frequency of 1000 Hz. However, in this case, the rotational speed of the photosensitive member 11 is the normal modes (S209). The CPU 200 rotates the photosensitive member at the normal mode rotational speed (300 mm/s) and applies a test bias with the ½ speed mode frequency (1000 Hz), thus effecting the discharge current amount control (S210). After the discharge current amount control is completed, the CPU 200 controls the drive switching means 208 so that the speed of the photosensitive member 11 is switched to the ½ speed mode speed (150 mm/s) in order to start the ½ speed mode image forming operation, thus effecting the image formation (S211). Similarly as in the case of the constant speed mode, depending on the temperature-rise state of the apparatus main assembly and the energization deterioration state of the charging member, the fluctuation in discharge current amount is caused to occur. For that reason, the discharge current amount C may desirably be effected based on the integrated number of sheets subjected to the continuous image formation. The A4-conversion integrated number of sheets is mounted by the CPU 200 and the discharge current amount control is effected every continuous 200 sheets (S212). During the discharge current amount control effected every continuous 200 sheets, the photosensitive member rotational speed is not changed. This is for the following reason. When the photosensitive member rotational speed is changed, it takes time until the rotational speed of the photosensitive member is stabilized, the down time during the continuous image formation can be reduced by rotating the photosensitive member at the ½ speed mode rotational speed (150 mm/s).

Then, in the case where the image formation on the sheets designated by the job input in S201 is completed, the CPU 200 ends the image formation to place the image forming apparatus in the stand-by state (S213).

In the case where the CPU 200 judges that the image form mode is the ⅓ speed mode in S208, the charging AC frequency is changed to the ⅓ speed mode frequency (667 Hz) (S214). That is, also in the case where the ⅓ speed mode is selected, similarly as in the case of the ½ speed mode, the photosensitive member 11 is rotated at the normal mode speed and only the charging AC frequency is switched to the ⅓ speed mode frequency to effect the discharge current amount control (S215). Similarly, after the discharge current amount control is completed, in order to start the ⅓ speed mode image forming operation, the CPU 200 controls the drive switching means 208 so that the speed of the photosensitive member 11 is switched to the ⅓ speed mode speed (100 mm/s), thus effecting the image formation (S216). Every 200 sheets subjected to the continuous image formation, the discharge current amount control is effected (S217). Similarly, the photosensitive member rotational speed is not changed from the ⅓ speed mode speed. Thereafter, in the case where the image formation on the sheets designated by the job input in S201 is completed, the CPU 200 ends the image formation and places the image forming apparatus in the stand-by state (S218).

Figure 12:
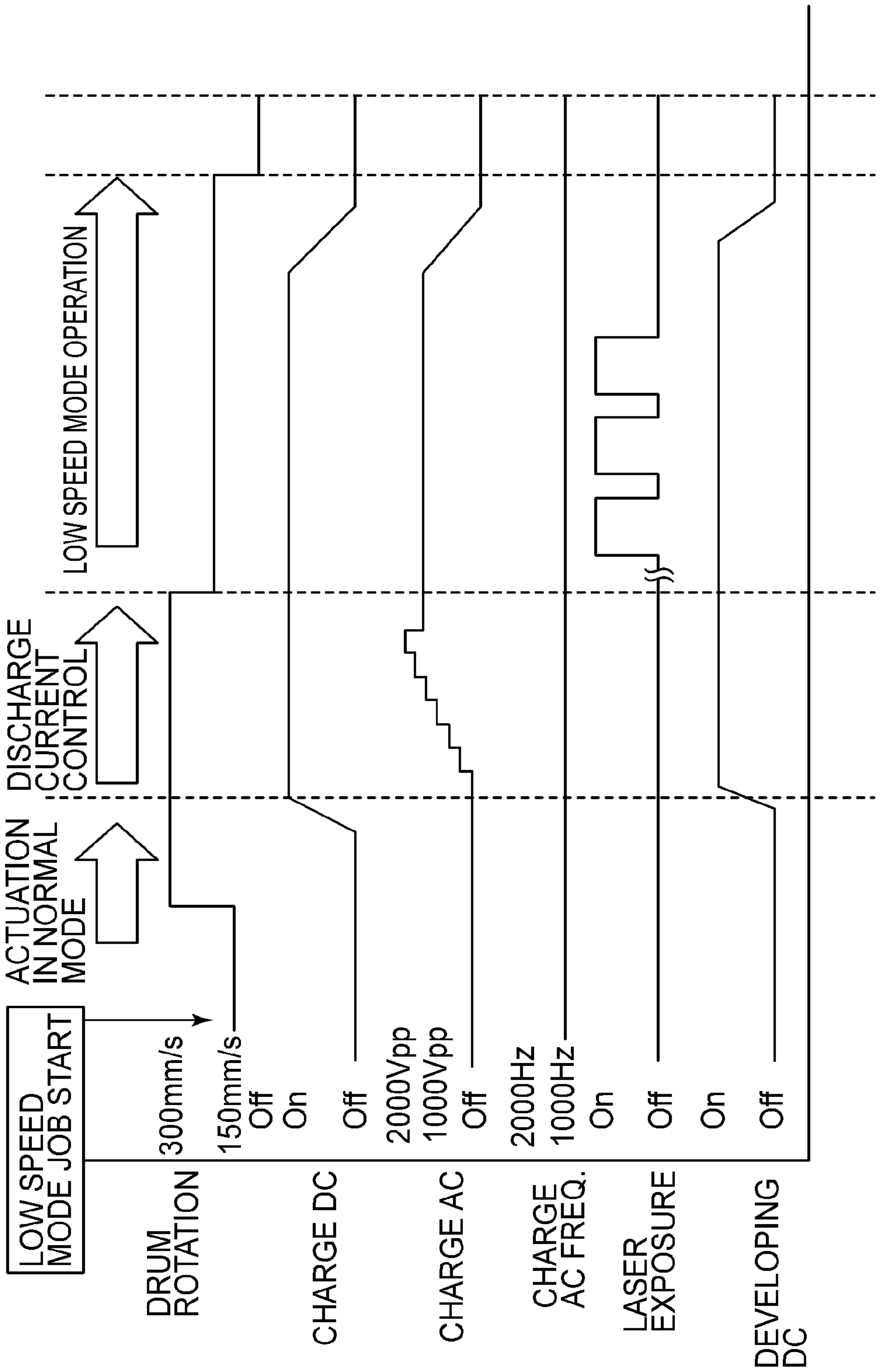
FIG. 12 is a time chart showing an operation when a low speed mode job is started from a stand-by state of the image forming apparatus in the embodiment of the present invention.
Figure 13:
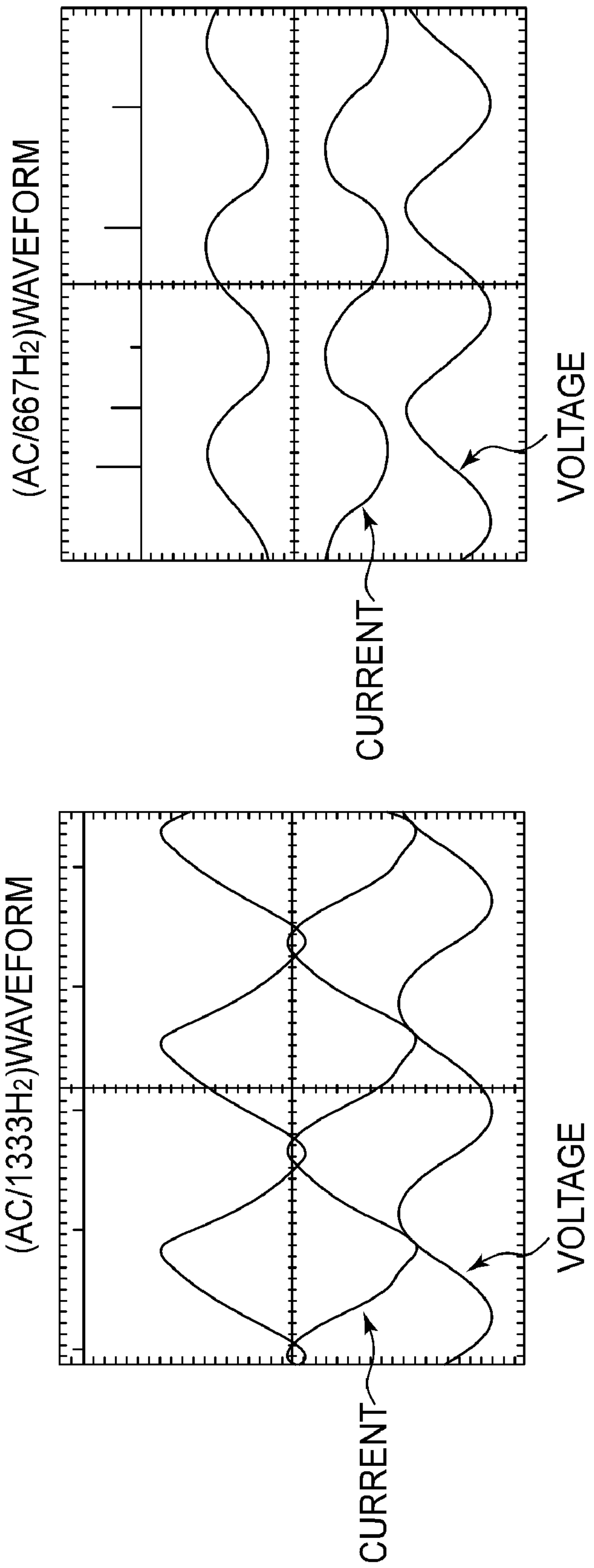
FIG. 13 includes schematic views for illustrating an influence on a charging waveform when a charging frequency is changed.
Figure 14:
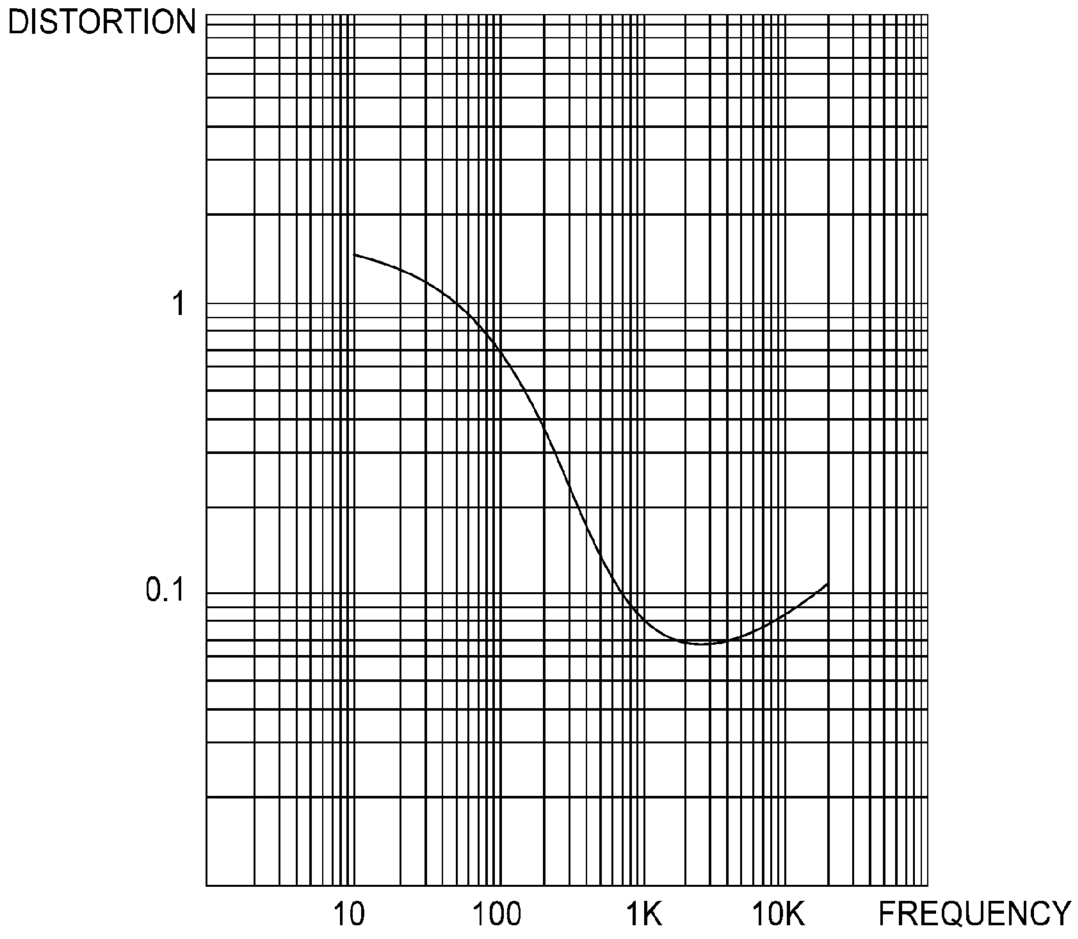
FIG. 14 is a graph showing a relationship between the charging frequency and an amount of distortion of the charging waveform.

With reference to FIG. 12, a flow of a switching operation of the image forming mode in this embodiment will be described more specifically.

When the job using the special paper, i.e., the job in the low speed mode is started, first, the rotational drive of the photosensitive member 11 and the intermediary transfer belt 31 is started. The rotational speeds of the photosensitive member 11 and the intermediary transfer belt 31 in the low speed mode are set at 150 mm/s but is increased up to 300 mm/s corresponding to the normal mode speed since the discharge current amount control is effected first. When the rotational speed of the photosensitive member 11 is stabilized at the predetermined speed, the charging DC voltage is applied and then the charging AC voltage are applied. In this case, first, the charging AC voltage is set at an initial set value of the sampling points for the discharge current amount control. In this embodiment, similarly as in Embodiment 1, the sampling was made by providing, as the sampling points of the charging AC voltage during the discharge current amount control, three points of 600 Vpp, 700 Vpp, and 800 Vpp in the undischarged area and three points of 1500 Vpp, 1600 Vpp and 1700 Vpp in the discharged area. Therefore, the charging AC voltage is set at 600 V first. Here, until the photosensitive member 11 is stabilized at the predetermined speed, the photosensitive member 11 is rotated about 5-full-circumference but an appropriate value is different depending on the diameter of the photosensitive member 11 and the type of the motor. Generally, the number of turn of the photosensitive member 11 is 3-full-circumference to 7-full-circumference. Further, as described in Embodiment 1, the relationship between the charging AC voltage and the charging AC current does not depend on the rotational speed of the photosensitive member 11 at all. For this reason, theoretically, there is no problem even when the discharge current amount control is started without awaiting rising the photosensitive member 11. As a result, further reduction in control time can be expected. In this embodiment, the speed of the photosensitive member 11 during the discharge current amount control is set at the same speed as that in the normal mode but may be increased further within a tolerable range of the constitution of the apparatus main assembly. Further, depending on the type of paper selected through the operating panel 203, the charging frequency is changed to that in the low speed mode, i.e., 1000 Hz in this embodiment before the charging AC voltage is applied.

Then, application of the developing DC voltage to the developing sleeve of the developing device 14 is started by the developing high voltage control means 206 with timing immediately before the surface of the photosensitive member 11 electrically charged by the charging roller 12 supplied with the charging DC voltage and the charging AC voltage passes through the developing device 14. During the discharge current amount control, there is no need to apply the developing high voltage but for the convenience of the application of the charging DC voltage during the discharge current amount control, it is preferable that the developing high voltage is applied in order to obviate the fluctuation in Vback.

During the discharge current amount control, similarly as in Embodiment 1, the operation for detecting the AC current is performed by providing, as the AC voltage values, three points in the discharged area and three points in the undischarged area, i.e., six points in total. The sampling time for each of the sampling points may desirably be a time corresponding to one-full-circumference of the photosensitive member 11 and may be at least a time corresponding to one-full-circumference of the charging roller 12. As described above, in this embodiment, the sampling was effected by using three measuring points of 600 Vpp, 700 Vpp and 800 Vpp in the undischarged area and using three measuring points of 1500 Vpp, 1600 Vpp and 1700 Vpp in the discharged area.

In the case where the measurement is effected at the three points in the discharged area and at the three points in the undischarged area as in this embodiment, operations which influence on the control time are as shown in FIGS. 11(*a*) to 11(*d*). The control times in the cases shown in FIGS. 11(*a*) to 11(*d*) are as described in Embodiment 1 (Table 1). Further, the relationship among the control times, the sampling modes, and the sampling conditions is identical to that shown in Table 1. That is, also in this embodiment, similarly as in Embodiment 1, it is possible to obtain the effect of reducing the control time.

After the completion of the above-described discharge current amount control, the rotational speed of the photosensitive member 11 is lowered to the ½ speed mode speed of 150 mm/s and when the rotational speed is stabilized, the laser light exposure by the laser exposure means 204 is started, so that the latent image formation is started.

In this embodiment, by utilizing such a property that the relationship between the charging AC voltage and the charging AC current, i.e., a so-called V-I characteristic, is not changed, the discharge current amount control is effected with the speed of the photosensitive member 11 as high as possible.

As described above, in this embodiment, when the job using the special paper is performed from the stand-by state, the charging AC frequency is switched depending on the photosensitive member speed in order to suppress the deterioration of the photosensitive member. According to this embodiment, even when the charging AC frequency is switched, as described above, during the pre-rotation, it is possible to efficiently perform control, in a very short time, capable of keeping the charging condition such as the charging AC current amount or the discharge current amount at a constant level. Therefore, according to this embodiment, in the case where the image forming speed is changed, it is possible to not only properly suppress the charging condition of the photosensitive member at each of the image forming speeds but also suppress the lowering in image productivity due to the control operation of the charging condition varying depending on the change in image forming speed.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application Nos. 280559/2008 filed Oct. 30, 2008 and 241698/2009 filed Oct. 20, 2009, which are hereby incorporated by reference.

What is claimed is:

1. An image forming apparatus comprising:

a rotatable photosensitive member;

a charging member for electrically charging said photosensitive member;

applying means for applying to said charging member a charging bias in the form of a DC voltage biased with an AC voltage;

toner image forming means for forming a toner image on said photosensitive member charged by said charging member;

setting means for setting a frequency of a first charging bias at a first frequency in a first mode in which said photosensitive member is rotated at a first speed to effect image formation and for setting a frequency of a second charging bias at a second frequency, different from the first frequency, in a second mode in which said photosensitive member is rotated at a second speed lower than the first speed to effect image formation;

detecting means for detecting a current passing between said charging member and said photosensitive member during application of a test bias to said charging member; and adjusting means for adjusting the second charging bias on the basis of an output of said detecting means when said photosensitive member is rotated at the first speed and a test bias having the second frequency is applied to said charging member at the time of switching an image forming mode from the first mode to the second mode.

2. An apparatus according to claim 1, wherein said adjusting means adjusts the first charging bias on the basis of an output of said detecting means when said photosensitive member is rotated at the first speed and a test bias having the first frequency is applied to said charging member at the time of switching the image forming mode from the second mode to the first mode.

3. An apparatus according to claim 2, wherein when the image is continuously formed in the second mode, said adjusting means adjusts the charging bias, to be applied during the image formation effected in the second mode, on the basis of an output of said detecting means when said photosensitive member is rotated at the second speed and a test bias having the frequency in the second mode is applied to said charging member.

4. An apparatus according to claim 1, wherein said mode is rotatable at a plurality of speeds including the first speed and the second speed depending on the image forming mode.

5. An image forming apparatus comprising:

a rotatable photosensitive member;

a charging member for electrically charging said photosensitive member;

applying means for applying to said charging member a charging bias in the form of a DC voltage biased with an AC voltage;

toner image forming means for forming a toner image on the charged photosensitive member;

setting means for setting a frequency of the charging bias at a predetermined frequency in a first mode in which said photosensitive member is rotated at a first speed to effect image formation;

detecting means for detecting a current passing between said charging member and said photosensitive member during application of a test bias to said charging member; and adjusting means for adjusting the charging bias to be applied during the image formation in the first mode on the basis of an output of said detecting means when said photosensitive member is rotated at a second speed lower than the first speed and a test bias having the predetermined frequency is applied to said charging member in a period from an input of an image forming signal to start of imagewise exposure of the charged photosensitive member to light by exposure means depending on the input image forming signal.

* * * * *